United States Patent
d'Alessandro

(10) Patent No.: US 10,821,943 B2
(45) Date of Patent: Nov. 3, 2020

(54) STORAGE TANK ASSEMBLY FOR A WORK VEHICLE

(71) Applicant: CNH Industrial America LLC, New Holland, PA (US)

(72) Inventor: Leonardo Sergio d'Alessandro, Santiago de Queretaro (MX)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 16/422,196

(22) Filed: May 24, 2019

(65) Prior Publication Data

US 2019/0359417 A1  Nov. 28, 2019

Related U.S. Application Data

(60) Provisional application No. 62/675,824, filed on May 24, 2018.

(51) Int. Cl.
| | |
|---|---|
| *B60P 3/22* | (2006.01) |
| *B62D 49/00* | (2006.01) |
| *B60P 3/30* | (2006.01) |
| *B60S 1/66* | (2006.01) |

(52) U.S. Cl.
CPC ............ *B60S 1/66* (2013.01); *B60P 3/2215* (2013.01); *B60P 3/22* (2013.01); *B60P 3/30* (2013.01); *B62D 49/00* (2013.01)

(58) Field of Classification Search
CPC . B60P 3/2215; B60P 3/22; B60P 3/30; A01M 7/0085; B62D 49/00
USPC ........... 280/830–839; 239/172; 224/430, 433
See application file for complete search history.

(56) References Cited

U.S. PATENT DOCUMENTS

| 1,405,216 | A | * | 1/1922 | Holmes | B62D 49/00 280/848 |
| 1,463,944 | A | * | 8/1923 | Fishleigh | B62D 49/00 280/848 |
| 2,743,934 | A | * | 5/1956 | Chambers | A01M 7/0085 280/833 |
| 2,946,598 | A | * | 7/1960 | Foster | B62D 49/00 280/830 |
| 3,311,183 | A | * | 3/1967 | Phillips | B62D 49/00 180/54.1 |

(Continued)

OTHER PUBLICATIONS

Liquid Tank, May 11, 2017, 1 pg.
Liquid Tank, Feb. 12, 2018, 1 pg.

*Primary Examiner* — Justin M Larson
(74) *Attorney, Agent, or Firm* — Rickard K. DeMille; Rebecca L. Henkel

(57) ABSTRACT

A storage tank assembly for a work vehicle includes a frame assembly configured to couple to a structure of the work vehicle. The storage tank assembly also includes a storage tank configured to store a liquid. The frame assembly is configured to support the storage tank on the structure of the work vehicle. In addition, the frame assembly is configured to position a first portion of the storage tank above a wheel assembly of the work vehicle, the first portion of the storage tank is contoured to substantially match a curvature of the wheel assembly, and the frame assembly is configured to position a second portion of the storage tank laterally inward of the wheel assembly such that the second portion of the storage tank extends within a vertical extent of the wheel assembly.

11 Claims, 13 Drawing Sheets

(56) References Cited

U.S. PATENT DOCUMENTS

| | | | | |
|---|---|---|---|---|
| 3,396,983 A * | 8/1968 | Massey | B62D 49/06 | 280/830 |
| 3,464,717 A * | 9/1969 | Davis | B60R 11/06 | 280/164.1 |
| 3,488,061 A * | 1/1970 | Harold | A01M 7/0082 | 280/479.1 |
| 3,583,718 A * | 6/1971 | Meyer | A01M 7/0085 | 280/830 |
| 3,857,576 A * | 12/1974 | Wilt | A01M 7/0085 | 280/834 |
| 3,900,201 A * | 8/1975 | Johnson | A01M 7/0085 | 280/833 |
| 4,022,331 A * | 5/1977 | Bean | A01M 7/0085 | 414/555 |
| 4,149,734 A * | 4/1979 | Sylvester | A01M 7/0085 | 280/833 |
| 4,232,874 A * | 11/1980 | Ystebo | A01M 7/0085 | 220/645 |
| 4,351,535 A * | 9/1982 | Mead | A01M 7/0085 | 224/410 |
| 4,387,835 A * | 6/1983 | Golzer | B62J 9/00 | 220/771 |
| D279,664 S * | 7/1985 | Waters, Jr. | D12/423 | |
| 4,643,441 A * | 2/1987 | Schartz | A01M 7/0082 | 224/410 |
| 6,079,741 A * | 6/2000 | Maver | B60R 9/00 | 224/404 |
| 6,286,870 B1 * | 9/2001 | Mulder | A01M 7/0085 | 280/830 |
| 6,293,450 B1 * | 9/2001 | Aron | B62J 9/20 | 224/430 |
| 7,182,177 B1 * | 2/2007 | Simnacher | B66F 3/12 | 187/211 |
| 7,207,470 B2 * | 4/2007 | Akita | B62J 9/20 | 224/413 |
| 8,056,828 B1 * | 11/2011 | Kline | A01C 17/005 | 239/147 |
| 8,172,268 B2 * | 5/2012 | Komorida | B60K 15/073 | 180/219 |
| 8,424,914 B2 * | 4/2013 | Honzek | A01C 15/006 | 280/834 |
| 8,839,999 B2 * | 9/2014 | Mulder | A01M 7/0085 | 224/410 |
| 9,669,751 B2 * | 6/2017 | Anderson | B60P 3/2215 | |
| 9,914,383 B2 * | 3/2018 | Anderson | B60P 3/2215 | |
| 2019/0053422 A1 * | 2/2019 | Holst | A01C 23/008 | |
| 2019/0359417 A1 * | 11/2019 | d'Alessandro | A01B 76/00 | |
| 2020/0114801 A1 * | 4/2020 | Bering | A01M 7/0085 | |

\* cited by examiner

STORAGE TANK ASSEMBLY FOR A WORK VEHICLE

CROSS REFERENCE TO RELATED APPLICATION

This application claims priority from and the benefit of U.S. Provisional Application Ser. No. 62/675,824, entitled "STORAGE TANK ASSEMBLY FOR A WORK VEHICLE", filed May 24, 2018, which is hereby incorporated by reference in its entirety.

BACKGROUND

The present disclosure relates generally to a storage tank assembly for a work vehicle.

Harvested agricultural crops (e.g., fruits, vegetables, etc.) may be transported from a field to a packaging facility via a storage compartment towed by a work vehicle (e.g., tractor). The harvested crops may be washed (e.g., to remove soil, field debris, etc.) at the packaging facility before being packaged. However, certain packaging facilities are located remote from a water source. Accordingly, storage tanks (e.g., for water, a liquid solution, etc.) may be mounted to the work vehicle to facilitate the crop washing process. For example, the harvested crops may be transported from the storage compartment to the packaging facility via a conveyor belt. Liquid solution from the storage tanks mounted to the work vehicle may be sprayed onto the crops moving along the conveyor belt, thereby washing the crops.

Furthermore, certain regions have regulations that require work vehicles and/or equipment towed by/coupled to the work vehicles to be cleaned before entering a roadway. The purpose of such regulations is to reduce the amount of debris (e.g., soil, agricultural material, etc.) on the roadway. Accordingly, operators typically wash the work vehicle/equipment before driving the work vehicle on a roadway. However, water is generally not available at the transition between the field and the roadway. Consequently, water within the storage tanks mounted to the work vehicle may be used for the washing process. However, mounting storage tanks to the work vehicle (e.g., for the crop washing process and/or the work vehicle/equipment washing process) may reduce operator visibility and/or increase the center of gravity of the work vehicle, thereby reducing vehicle performance.

BRIEF DESCRIPTION

In certain embodiments, a storage tank assembly for a work vehicle includes a frame assembly configured to couple to a structure of the work vehicle. The storage tank assembly also includes a storage tank configured to store a liquid. The frame assembly is configured to support the storage tank on the structure of the work vehicle. In addition, the frame assembly is configured to position a first portion of the storage tank above a wheel assembly of the work vehicle, the first portion of the storage tank is contoured to substantially match a curvature of the wheel assembly, and the frame assembly is configured to position a second portion of the storage tank laterally inward of the wheel assembly such that the second portion of the storage tank extends within a vertical extent of the wheel assembly.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
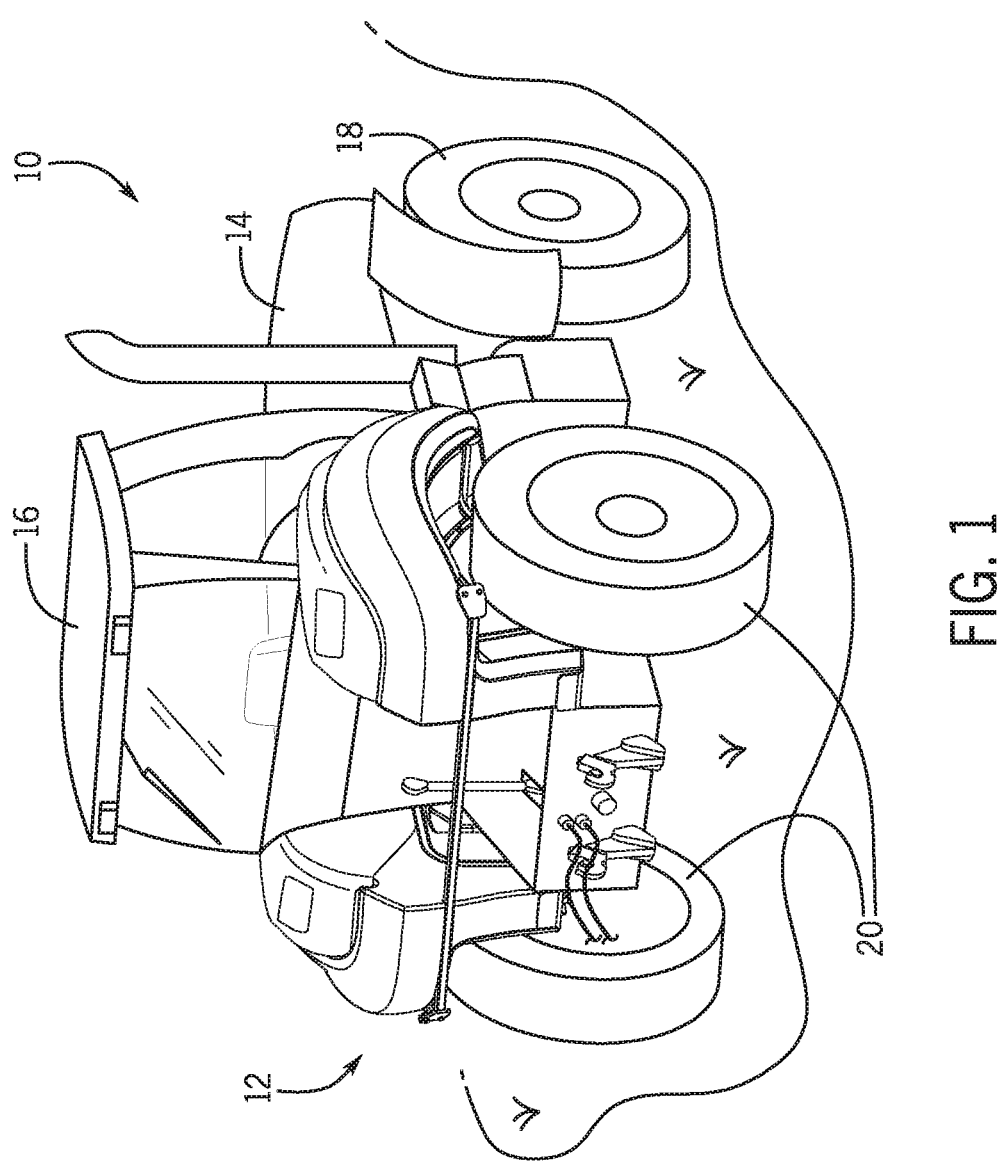
FIG. 1 is a perspective view of an embodiment of a work vehicle having a storage tank assembly.

FIG. 1 is a perspective view of an embodiment of a work vehicle 10 having a storage tank assembly 12. In the illustrated embodiment, the work vehicle 10 is a tractor. However, the storage tank assembly 12 disclosed herein may be employed within other work vehicles, such as off-road vehicles (e.g., skids steers, construction equipment, etc.), agricultural vehicles (e.g., harvesters, sprayers, etc.), or any other suitable work vehicle types. In the illustrated embodiment, the work vehicle 10 has a body 14 configured to house an engine (e.g., diesel engine), transmission, cooling system, and hydraulic system. Furthermore, the work vehicle 10 has a cab 16 where an operator may sit or stand to operate the work vehicle 10. The work vehicle 10 also has two front wheel assemblies 18 (e.g., each including a wheel and a tire) and two rear wheel assemblies 20 (e.g., each including a wheel and a tire) that rotate to move the work vehicle 10 through a field. The front wheel assemblies 18 and/or the rear wheel assemblies 20 may be driven to rotate by the engine and/or the hydraulic system (e.g., hydraulic motor(s) of the hydraulic system). While the illustrated work vehicle 10 includes wheel assemblies, in other embodiments, the work vehicle may include track assemblies or a combination of wheel and track assemblies.

The storage tank assembly 12 is configured to store liquid for treating (e.g., washing) harvested crops before packaging. For example, harvested crops may be washed (e.g., to remove soil, field debris, etc.) at a packaging facility before being packaged. Storing liquid (e.g., water, solution, etc.) in the storage tank assembly 12 of a work vehicle used to transport the harvested crops enables the harvested crops to be treated (e.g., washed) at packaging facilities that do not have access to other sources of the liquid (e.g., water, solution, etc.). In addition, the liquid (e.g., water) stored within the storage tank assembly 12 may be used for washing the work vehicle 10 and/or equipment towed by/coupled to the work vehicle 10, such as a tillage implement, a seeding implement, or a harvesting implement, among others. For example, certain regions have regulations that require work vehicles and/or equipment towed by/coupled to the work vehicles to be cleaned before entering a roadway. Storing liquid (e.g., water, washing solution, etc.) in the storage tank assembly 12 enables an operator to clean the work vehicle and/or equipment before entering a roadway (e.g., while other liquid sources are not available).

In certain embodiments, the storage tank assembly 12 includes a left section positioned proximate to the left rear wheel assembly and a right section positioned proximate to the right rear wheel assembly. Each section includes a frame assembly configured to couple to a structure of the work vehicle (e.g., a rear axle), and a storage tank configured to store a liquid, such as water. The frame assembly is configured to support the storage tank on the structure of the work vehicle. In addition, the frame assembly is configured to position a first portion of the storage tank above a respective wheel assembly of the work vehicle, and the first portion of the storage tank is contoured to substantially match a curvature of the respective wheel assembly. Furthermore, the frame assembly is configured to position a second portion of the storage tank laterally inward of the respective wheel assembly such that the second portion of the storage tank extends within a vertical extent of the respective wheel assembly. Due to the position and shape of each storage tank, the storage tanks are positioned below the windows of the cab. Accordingly, the storage tanks do not substantially interfere with operator visibility (e.g., as compared to storage tanks mounted laterally outward from the cab and having a vertical extent that overlaps a vertical extent of at least one cab window/opening). Furthermore, due to the weight of the storage tanks, the frame assemblies, and any liquid within the storage tanks, positioning the storage tank assembly over the wheel assemblies may enable ballasting of the work vehicle (e.g., according to operating conditions), thereby enhancing the traction of the wheel assemblies and reducing wheel slippage.

In the illustrated embodiment, each storage tank is positioned below a respective fender, such that the first portion of the storage tank is positioned between the fender and the respective wheel assembly. However, in alternative embodiments, at least one storage tank may include certain features of the fender (e.g., light(s), reflector(s), etc.). In such embodiments, the fender may be omitted (e.g., replaced by the storage tank assembly). Furthermore, while the storage tank assembly includes two sections positioned proximate to the rear wheel assemblies in the illustrated embodiment, in other embodiments, the storage tank assembly may include a single section positioned proximate to one of the rear wheel assemblies. Furthermore, in certain embodiments, the storage tank assembly may include a section positioned proximate to at least one of the front wheel assemblies (e.g., in addition to the section(s) positioned proximate to the rear wheel assembly/assemblies, or as an alternative to the section(s) positioned proximate to the rear wheel assembly/assemblies).

Figure 2:
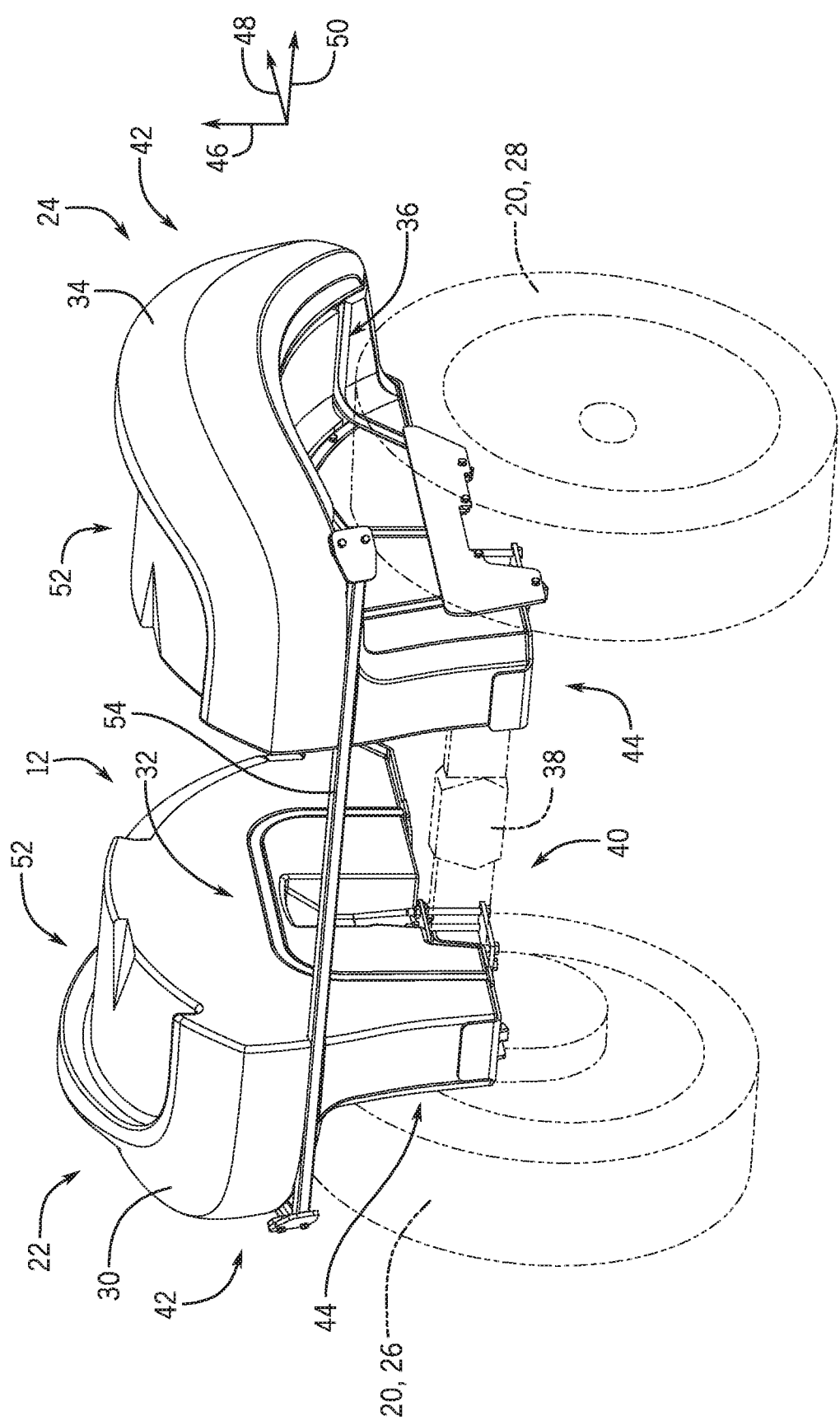
FIG. 2 is a perspective view of an embodiment of a storage tank assembly that may be employed within the work vehicle of FIG. 1.

FIG. 2 is a perspective view of an embodiment of a storage tank assembly 12 that may be employed within the work vehicle of FIG. 1. As illustrated, the storage tank assembly 12 includes a left section 22 and a right section 24. The left section 22 is positioned above and laterally inward of a left wheel assembly 26 of the rear wheel assemblies 20, and the right section 24 is positioned above and laterally inward of a right wheel assembly 28 of the rear wheel assemblies 20. The left section 22 of the storage tank assembly 12 includes a first storage tank 30 and a first frame assembly 32, and the right section 24 of the storage tank assembly 12 includes a second storage tank 34 and a second frame assembly 36. Each storage tank is configured to store a liquid, and each frame assembly is configured to couple to a structure of the work vehicle, such as the illustrated rear axle 38. In addition, each frame assembly is configured to support the respective storage tank on the structure of the work vehicle. In the illustrated embodiment, each section of the storage tank assembly 12 includes a respective mounting assembly 40 configured to couple the frame assembly of the section to the rear axle 38 such that an entire weight of the storage tank assembly 12 (e.g., and any liquid within the storage tanks) is supported only by the rear axle. However, in other embodiments, the frame assemblies may be coupled to additional structure(s) of the work vehicle such that the weight of the storage tank assembly (e.g., and any liquid within the storage tanks) is supported by the rear axle and the additional structure(s). Furthermore, in certain embodiments, the frame assembly of at least one section may be coupled to another suitable structure of the work vehicle (e.g., a frame of the work vehicle) instead of the rear axle. In addition, while each frame assembly is coupled to the structure by a respective mounting assembly in the illustrated embodiment, in other embodiments, at least one frame assembly may be coupled to the structure of the work vehicle by another suitable connection system, such as a welded connection or an adhesively bonded connection.

In the illustrated embodiment, each storage tank includes a first portion 42 and a second portion 44. The first frame assembly 32 is configured to position the first portion 42 of the first storage tank 30 above the left wheel assembly 26 along a vertical axis 46, and the second frame assembly 36 is configured to position the first portion 42 of the second storage tank 34 above the right wheel assembly 28 along the vertical axis 46. In addition, the first portion of each storage tank (e.g., a bottom surface of the first portion) is contoured to substantially match the curvature of the respective wheel assembly (e.g., the curvature of a tire of the respective wheel assembly). As illustrated, a bottom surface of the first portion of each storage tank curves along a longitudinal axis 48, such that a radius of curvature of the bottom surface substantially matches a radius of curvature of the respective wheel assembly (e.g., the difference between the radius of curvature of the bottom surface and the radius of curvature of the wheel assembly is less than 15 percent, less than 10 percent, less than 5 percent, or less than 2 percent). Because the contour of the bottom surface of the first portion of each storage tank substantially matches the curvature of the respective wheel assembly, the storage tank may block significantly more debris (e.g., dirt, rocks, etc.) from being expelled by the wheel assembly during operation of the work vehicle than a storage tank with a substantially flat bottom surface positioned over the respective wheel assembly. In addition, the center of gravity of the work vehicle may be lowered (e.g., as compared to a work vehicle having a storage tank with a substantially flat bottom surface positioned over a respective wheel assembly), thereby increasing the stability of the work vehicle. Furthermore, in the illustrated embodiment, the curvature of the top surface of the first portion of each storage tank substantially matches the curvature of the respective bottom surface, thereby further lowering the center of gravity. However, in other embodiments, the first portion of at least one storage tank may have another suitable shape.

Furthermore, the first frame assembly 32 is configured to position the second portion 44 of the first storage tank 30 inward of the left wheel assembly 26 along a lateral axis 50, such that the second portion 44 of the first storage tank 30 extends within a vertical extent of the left wheel assembly 26 (e.g., the extent of the left wheel assembly along the vertical axis 46). In addition, the second frame assembly 36 is configured to position the second portion 44 of the second storage tank 34 inward of the right wheel assembly 28 along the lateral axis 50, such that the second portion 44 of the second storage tank 34 extends within a vertical extent of the right wheel assembly 28 (e.g., the extent of the right wheel assembly along the vertical axis 46). By positioning the second portion of each storage tank laterally inward of the respective wheel assembly, a volume of the storage tank is positioned remote from the field of view of the work vehicle operator, thereby enhancing operator visibility. In addition, because the second portion of each storage tank overlaps the respective wheel assembly along the vertical axis, the center of gravity of the work vehicle may be lowered (e.g., as compared to a work vehicle having a storage tank mounted laterally outward from the cab and having a vertical extent that overlaps a vertical extent of the cab), thereby increasing the stability of the work vehicle.

In the illustrated embodiment, the first portion 42 of each storage tank extends across an entire lateral extent of the respective wheel assembly (e.g., the extent of the wheel assembly along the lateral axis 50). However, in alternative embodiments, the first portion of at least one storage tank may extend across a portion of the lateral extent of the respective wheel assembly. Furthermore, the second portion 44 of each storage tank has a generally rectangular cross-section within a plane formed by the vertical axis 46 and the lateral axis 50. However, in other embodiments, the second portion of at least one storage tank may have any other suitable shape (e.g., to accommodate elements/structures of the work vehicle). In addition, while each storage tank in the illustrated embodiment includes a first portion and a second portion, in alternative embodiments, one portion of at least one storage tank may be omitted. For example, in certain embodiments, the second portion (e.g., the portion positioned laterally inward of the respective wheel assembly and overlapping the respective wheel assembly along the vertical axis) of at least one storage tank may be omitted. Furthermore, in certain embodiments, the first portion (e.g., the portion positioned above the respective wheel assembly along the vertical axis) of at least one storage tank may be omitted.

In the illustrated embodiment, each storage tank includes a respective recess 52 configured to receive a fender of the work vehicle. The recess 52 enables the storage tank to be positioned between the respective wheel assembly and the fender (e.g., while the work vehicle includes wheel assemblies that establish gaps between the wheel assemblies and the fenders sufficient to accommodate the storage tanks). However, in alternative embodiments, the recess of at least one storage tank may be omitted, and the storage tank (e.g., the first portion of the storage tank) may serve as the fender. In such embodiments, light(s), reflector(s), antenna(s), other suitable components, or a combination thereof, may be mounted to the storage tank (e.g., to the first portion of the storage tank).

As discussed in detail below, each frame assembly is formed from multiple bars coupled to one another to establish a framework that supports the respective storage tank. In the illustrated embodiment, the storage tank assembly 12 includes a cross-bar 54 coupled to the bars of the first frame assembly 32 and to the bars of the second frame assembly 36. The cross-bar 54 is secured to a mounting plate of each frame assembly via fasteners. However, in alternative embodiments, the cross-bar may be coupled to each frame assembly by any suitable connection system (e.g., a welded connection, an adhesive connection, etc.). The cross-bar 54 is configured to increase the stability of the storage tanks during operation of the work vehicle. However, in certain embodiments, mounting assemblies, which couple the frame assemblies to the work vehicle structure, may effectively support the storage tanks (e.g., and any liquid within the storage tanks) without the cross-bar. In such embodiments, the cross-bar may be omitted.

In certain embodiments, each storage tank may include one or more features configured to facilitate filling the storage tank with liquid, flowing liquid out of the storage tank, and determining a level of the liquid within the storage tank. For example, the storage tank assembly may include one or more pumps configured to flow liquid from a source to each storage tank. In certain embodiments, the pump(s) may also be used to flow the liquid out of the storage tanks. However, in further embodiments, at least one storage tank may include an outlet at the bottom of the storage tank to enable liquid to flow out of the storage tank under the influence of gravity. Furthermore, in certain embodiments, at least one storage tank may include a fill level indicator. For example, the storage tank may include a transparent/translucent window that enables an operator to visually determine the level of liquid within the storage tank. In addition or alternatively, an electronic unit (e.g., float/sender) may be included and configured to output a signal indicative of the level of liquid within the storage tank. In certain embodiments, the storage tanks of the storage tank assembly may store the same liquid (e.g., water, etc.). However, in other embodiments, each storage tank of the storage tank assembly may store a different liquid. In such embodiments, the storage tank assembly may include a pump system (e.g., pump, hoses, fittings, etc.) for each storage tank to control the flow of each respective liquid. While storing water in the storage tanks is described above, each storage tank may be used to store any other suitable liquid, such as chlorinated water, liquid fertilizer, or oil, for example.

In the illustrated embodiment, each storage tank extends outwardly along the lateral axis 50 beyond the lateral extent of the respective frame assembly (e.g., and any other structural elements coupled to the respective frame assembly, such as the cross-bar). Accordingly, each frame assembly (e.g., and any other structural elements coupled to the respective frame assembly, such as the cross-bar) does not extend outwardly beyond the lateral extent of the respective storage tank along the lateral axis 50. As a result, for a selected liquid capacity, the extent of the storage tank assembly along the lateral axis 50 may be less than a storage tank assembly having a frame assembly/structural element that extends laterally beyond the outward lateral extent of a respective storage tank. In addition, for a storage tank assembly having a selected extent along the lateral axis, the capacity of the storage tanks may be greater than storage tanks of a storage tank assembly having a frame assembly/ structural element that extends laterally beyond the outward lateral extent of a respective storage tank. However, in other embodiments, at least one frame assembly/structure element may extend laterally outward beyond the lateral extent of the respective storage tank(s).

Figure 3:
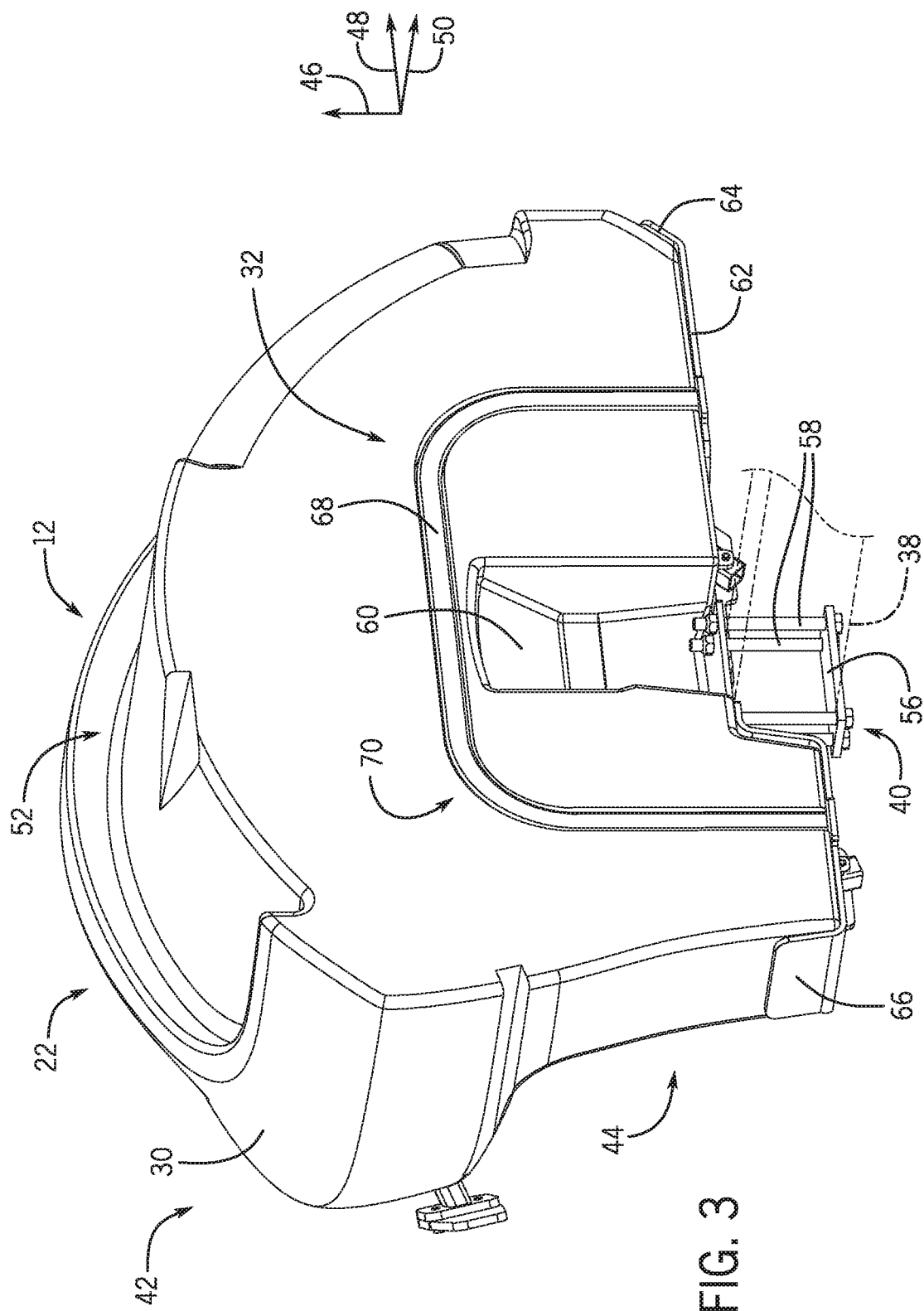
FIG. 3 is a perspective view of a left section of the storage tank assembly of FIG. 2.

FIG. 3 is a perspective view of the left section 22 of the storage tank assembly 12 of FIG. 2. As previously discussed, the left section 22 of the storage tank assembly 12 includes a mounting assembly 40 configured to couple the first frame assembly 32 to the rear axle 38. In the illustrated embodiment, the mounting assembly 40 includes a mounting plate 56 and four rods 58. As illustrated, the mounting plate 56 is positioned beneath the rear axle 38 along the vertical axis 46, and the first frame assembly 32 is positioned above the rear axle 38 along the vertical axis 46. The rods 58 couple the mounting plate 56 to the first frame assembly 32, thereby securing the frame assembly 32 to the rear axle 38. In the illustrated embodiment, each rod includes a head at one end and a thread section at the other end. The head is in contact with the mounting plate, and a fastener (e.g., nut) is engaged with the threaded section and in contact with the first frame assembly. As the fastener is driven to rotate about the threaded section of the rod, the rear axle is compressed between the first frame assembly and the mounting plate, thereby securing the first frame assembly to the rear axle. In the illustrated embodiment, a recess 60 is formed in the first storage tank 30 to facilitate access to the fasteners.

While the head of each rod is in contact with the mounting plate in the illustrated embodiment, in other embodiments, the head of at least one rod may be in contact with the first frame assembly. In such embodiments, the threaded section of the at least one rod may extend through the mounting plate, and a respective fastener may be engaged with the threaded section of the at least one rod and in contact with the mounting plate. Furthermore, while the illustrated mounting assembly includes four rods, in other embodiments, the mounting assembly may include more or fewer rods (e.g., 1, 2, 3, 4, 5, 6, or more). In addition, at least one rod may engage the mounting plate and/or the first frame assembly via another suitable connection (e.g., instead of the head/fastener), such as a pin or a threaded connection, among other suitable connections. Furthermore, in certain embodiments, the rods and/or the mounting plate may be omitted, and the mounting assembly may couple the first frame assembly to the rear axle by another suitable type of connection system (e.g., a welded connection, an adhesive connection, a bolted connection, etc.).

In the illustrated embodiment, the first frame assembly 32 includes a shield 62 positioned beneath the second portion 44 of the first storage tank 30 along the vertical axis 46. In certain embodiments, the shield 62 is formed from at least one sheet of material (e.g., metal, composite material, etc.). However, in other embodiments, the shield may be formed from any suitable structure/material. The shield 62 is configured to block objects (e.g., rocks, agricultural material, etc.) from impacting the first storage tank 30, thereby increasing the longevity of the first storage tank 30. In addition, the shield 62 contacts a bottom surface of the second portion 44 of the first storage tank 30, thereby supporting at least a portion of the weight of the first storage tank 30 (e.g., and any liquid within the first storage tank).

In the illustrated embodiment, the shield 62 includes a first lip 64 and a second lip 66. The first lip 64 is positioned at a forward portion of the shield 62 along the longitudinal axis 48, and the second lip 66 is positioned at a rear portion of the shield 62 along the longitudinal axis 48. Each lip is configured to engage the first storage tank 30, thereby blocking movement of the first storage tank 30 relative to the first frame assembly 32 along the longitudinal axis 48. As illustrated, each lip is formed to substantially match the shape of the first storage tank 30 at the location of the lip, thereby facilitating contact between the lip and the storage tank. While the illustrated shield 62 includes two lips configured to block longitudinal movement of the first storage tank 30, in other embodiments, the shield may include more or fewer lips (e.g., 1, 2, 3, 4, 5, 6, 7, 8, or more) configured to block movement of the first storage tank along the longitudinal axis and/or along the lateral axis. Furthermore, in certain embodiments, the lips may be omitted.

The first frame assembly 32 includes multiple bars configured to support the first storage tank 30. As illustrated, the bars includes a first bar 68 that is substantially U-shaped. A first end of the first bar 68 is coupled to the shield 62 (e.g., via a welded connection), and a second end of the first bar 68 is coupled to the shield 62 (e.g., via a welded connection). The first bar 68 is configured to block laterally inward movement of the first storage tank 30 (e.g., movement of the first storage tank 30 inwardly along the lateral axis 50) relative to the first frame assembly 32. In addition, the first storage tank 30 includes a first recess 70 configured to receive the first bar 68, thereby enabling the lateral extent of the first storage tank 30 to be greater than a storage tank without the recess (e.g., a storage tank having a substantially flat surface that contacts the first bar).

Figure 4:
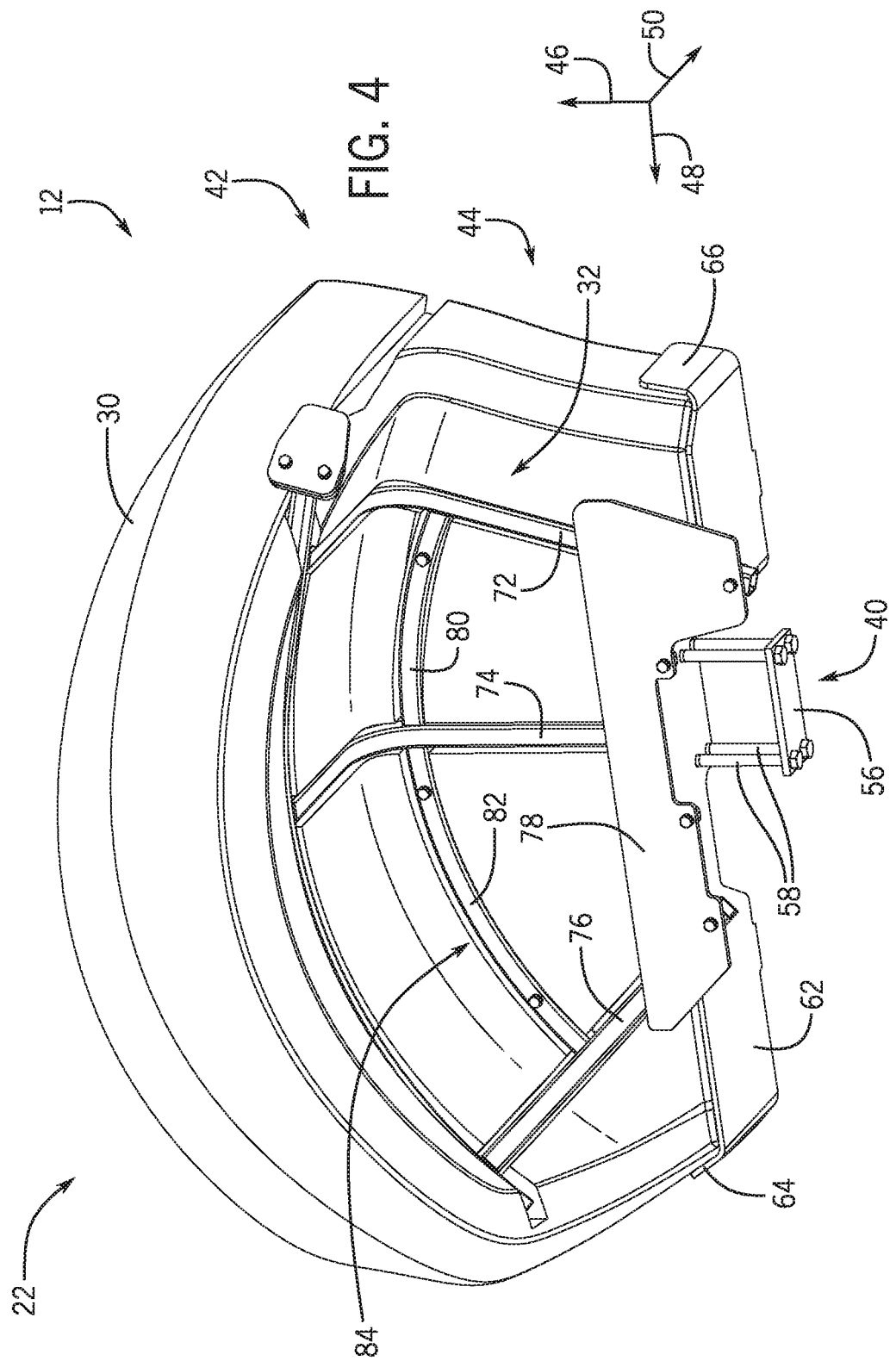
FIG. 4 is another perspective view of the left section of the storage tank assembly of FIG. 2.

FIG. 4 is another perspective view of the left section 22 of the storage tank assembly 12 of FIG. 2. In the illustrated embodiment, the first frame assembly 32 includes a second bar 72, a third bar 74, and a fourth bar 76. The second bar 72, the third bar 74, and the fourth bar 76 are coupled to a support plate 78 (e.g., via a welded connection), which, in turn, is coupled to the shield 62 (e.g., via fasteners). The second, third, and fourth bars are configured to block laterally outward movement of the first storage tank 30 (e.g., outward movement of the first storage tank along the lateral axis 50) relative to the first frame assembly 32 via contact with the second portion 44 of the first storage tank 30. In addition, the second, third, and fourth bars are configured to block downward movement of the first storage tank 30 (e.g., along the vertical axis 46) relative to the first frame assembly 32 via contact with the first portion 42 of the first storage tank 30. Accordingly, the second, third, and fourth bars are configured to support a portion of the weight of the first storage tank (e.g., and any liquid within the first storage tank). Furthermore, in the illustrated embodiment, the first frame assembly 32 includes a fifth bar 80 disposed between and coupled to the second bar 72 and the third bar 74 (e.g., via welded connections), and the first frame assembly 32 includes a sixth bar 82 disposed between and coupled to the third bar 74 and the fourth bar 76 (e.g., via welded connections). The fifth and sixth bars are configured to support and effectively position the second, third, and fourth bars.

While the frame assembly includes three bars to block laterally outward movement and downward movement of the storage tank, in other embodiments, more or fewer bars may be utilized. For example, in certain embodiments, the frame assembly may include 1, 2, 3, 4, 5, 6, 7, 8, or more bars to block laterally outward movement and/or downward movement of the storage tank. For example, the frame assembly may include a first set of bars to block laterally outward movement of the storage tank, and a second set of bars (e.g., coupled to the first set of bars) to block downward movement of the storage tank. In addition, while two supporting/positioning bars are coupled to the bars configured to block laterally outward movement and downward movement of the storage tank, in other embodiments, the frame assembly may include more or fewer supporting/positioning bars (e.g., 0, 1, 2, 3, 4, 5, 6, or more).

In the illustrated embodiment, each bar is disposed within a respective recess 84, which is configured to receive the respective bar. The recesses 84 enable the lateral extent of the second portion 44 of the first storage tank 30 and the vertical extent of the first portion 42 of the first storage tank 30 to be greater than a storage tank without the recesses (e.g., a storage tank having substantially flat surfaces that contact the bars). In the embodiment disclosed herein with reference to FIGS. 3-4, each bar is disposed within a respective recess. However, in alternative embodiments, at least one recess may be omitted (e.g., such that the respective bar contacts a substantially flat surface of the storage tank).

Figure 5:
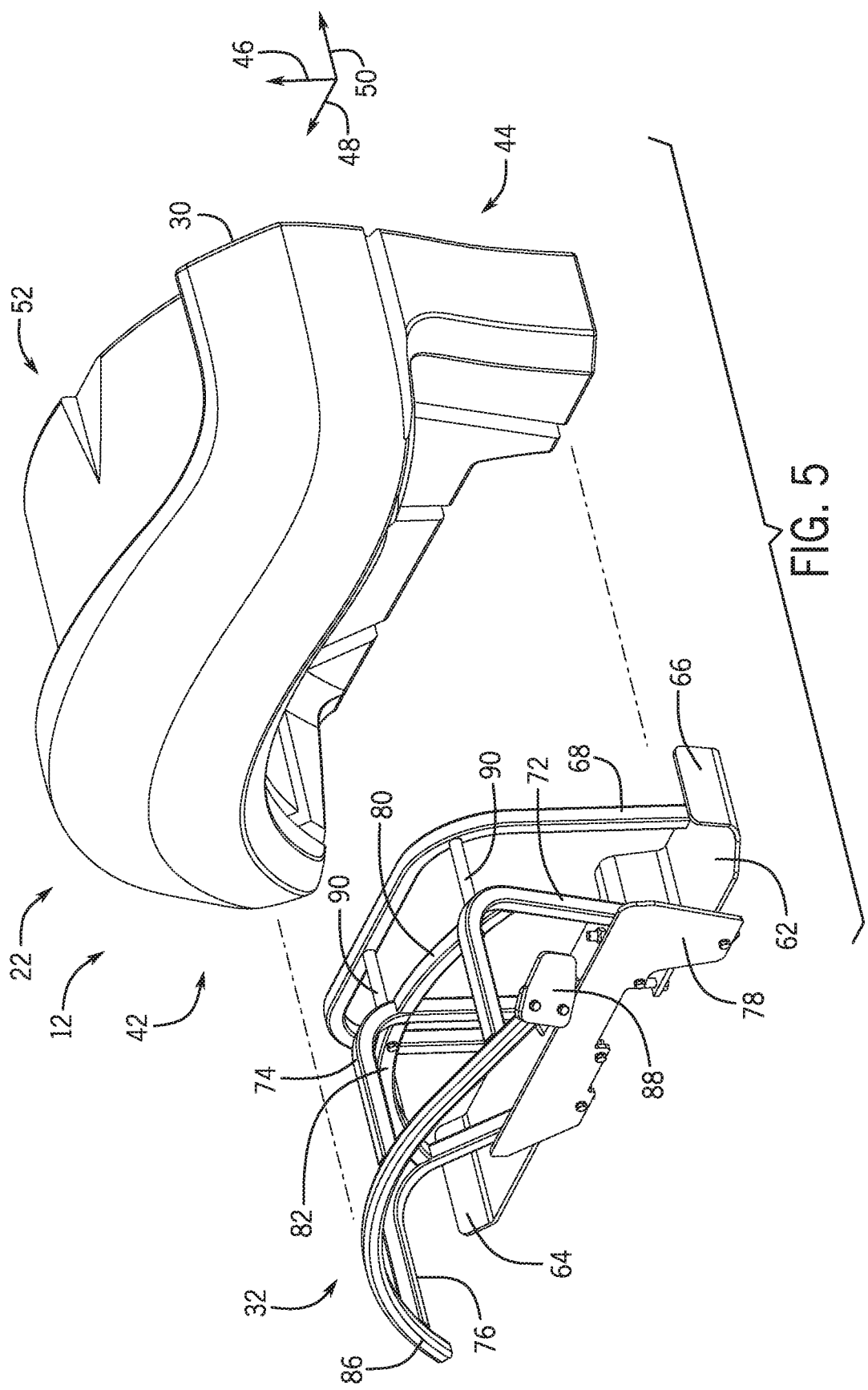
FIG. 5 is an exploded view of the left section of the storage tank assembly of FIG. 2, in which a storage tank is separated from a frame assembly.

FIG. 5 is an exploded view of the left section 22 of the storage tank assembly 12 of FIG. 2, in which the first storage tank 30 is separated from the first frame assembly 32. In the illustrated embodiment, the first frame assembly 32 includes a seventh bar 86 coupled to the second, third, and fourth bars (e.g., via welded connections). The seventh bar 86 is configured to support and effectively position the second, third, and fourth bars. The seventh bar 86 is also configured to support the first storage tank 30 via contact with a bottom surface of the first portion 42 of the first storage tank 30. In the illustrated embodiment, a mounting plate 88 is coupled to the seventh bar 86 (e.g., via a welded connection) and configured to support the cross-bar (e.g., via a fastener connection). However, if the cross-bar is omitted, the mounting plate may also be omitted.

In addition, the first frame assembly 32 includes support rods 90 extending between the first bar 68 and the fifth bar 80 and between the first bar 68 and the sixth bar 82 (e.g., via fastener connections). The support rods 90 are configured to enhance the rigidity of the first frame assembly 32. While the first frame assembly 32 includes three support rods 90 in the illustrated embodiment, in other embodiments, the first frame assembly may include more or fewer support rods (e.g., 0, 1, 2, 3, 4, 5, 6, or more). In addition, in certain embodiments, a support rod may extend between any suitable pair of bars. In the illustrated embodiment, each support rod 90 extends through a respective passage of the first storage tank 30, thereby enabling the support rod to couple to the respective bars on opposite lateral sides of the first storage tank 30. However, in alternative embodiments, the first storage tank may be shaped to accommodate at least one support rod. In addition, each support rod may have any suitable cross-sectional shape (e.g., circular, square, etc.).

While the first frame assembly 32 is formed separately from the first storage tank 30 in the illustrated embodiment, in other embodiments, the first frame assembly and the first storage tank may be formed as an integrated unit. For example, in certain embodiments, the storage tank may be formed by a molding process (e.g., a rotational molding process). In such embodiments, the bars, the support rods, the shield, or any combination thereof, may be disposed within the mold cavity during the storage tank molding process, such that the resultant storage tank assembly includes one or more frame assembly components integrally molded with the storage tank. Furthermore, while the illustrated frame assembly is formed from the shield, the bars, and the support rods, in other embodiments, the frame assembly may be formed from any other and/or additional components suitable for supporting the respective storage tank.

Figure 6:
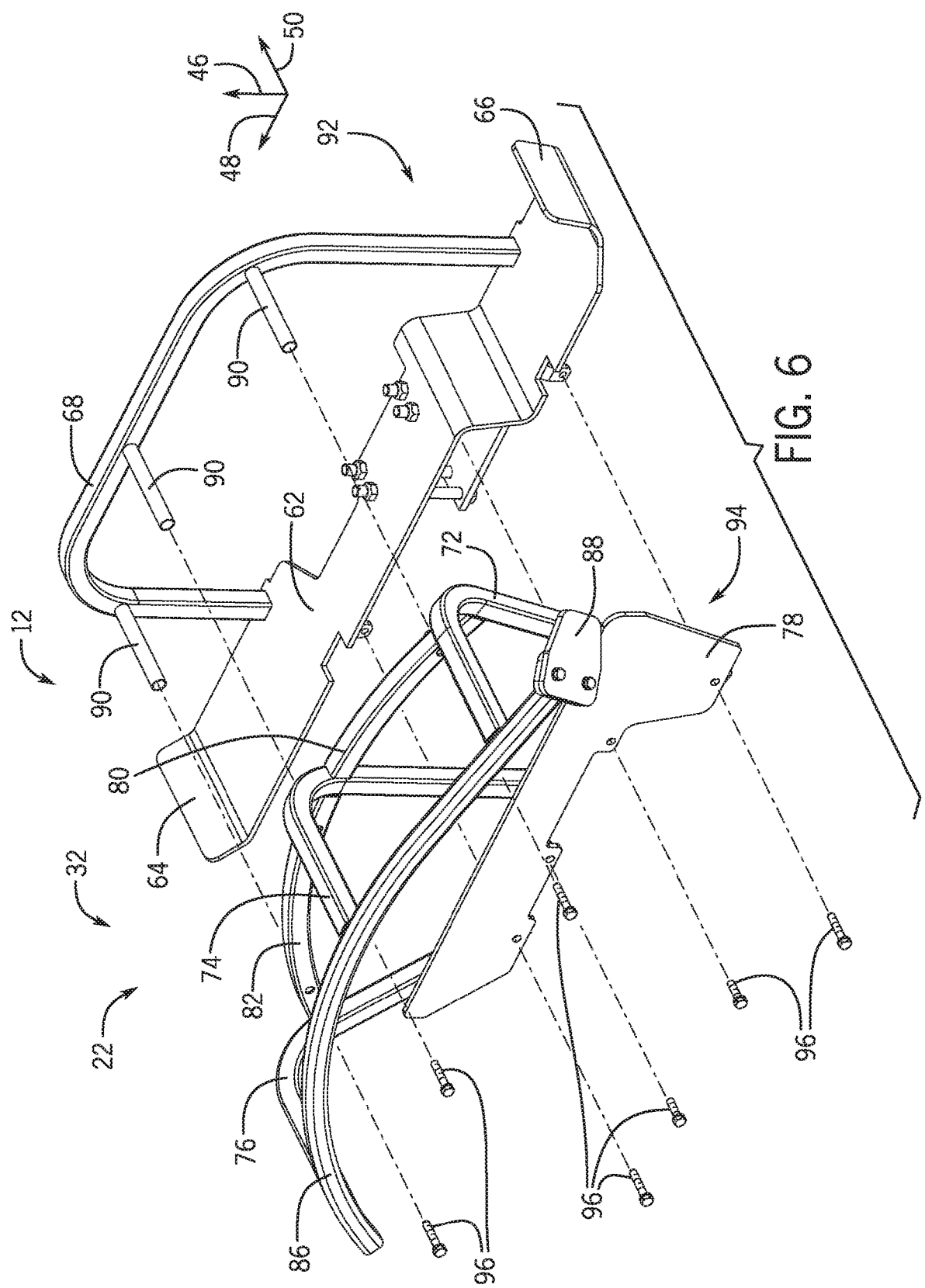
FIG. 6 is an exploded view of the frame assembly of FIG. 5.

FIG. 6 is an exploded view of the first frame assembly 32 of FIG. 5. As illustrated, the first frame assembly 32 include a first part 92 and a second part 94. The first part 92 is formed from the first bar 68, the shield 62, and the support rods 90. For example, the first bar 68 may be welded to the shield 62, and the support rods 90 may be welded to the first bar 68. In addition, the second part 94 is formed from the support plate 78, the second bar 72, the third bar 74, the fourth bar 76, the fifth bar 80, the sixth bar 82, and the seventh bar 86. For example, the support plate 78 may be welded to the second bar 72, the third bar 74, and the fourth bar 76. The fifth bar 80 may be welded to the second bar 72 and the third bar 74, and the sixth bar 82 may be welded to the third bar 74 and the fourth bar 76. In addition, the seventh bar 86 may be welded to the second, third and fourth bars.

To couple the left section 22 of the storage tank assembly 12 to a structure of the work vehicle (e.g., the rear axle), the first part 92 of the first frame assembly 32 may be coupled to the structure (e.g., via the mounting assembly). The passages of the first storage tank may then be aligned with the support rods 90, and the first storage tank may be translated toward the first part 92 of the first frame assembly 32 along the lateral axis 50. Upon contact between the first storage tank and the first bar 68 (e.g., as the first bar 68 engages the respective recess within the storage tank) movement of the first storage tank in the laterally inward direction is blocked. The second part 94 of the first frame assembly 32 may then be translated (e.g., along the lateral axis 50) toward the first storage tank until the bars of the second part 94 engage respective recesses in the first storage tank. Fasteners 96 may then be inserted through openings in the second part 94 and engaged with the first part 92 to secure the first storage tank to the first frame assembly 32. In certain embodiments, one or more fasteners 96 may be inserted through the opening(s) in the second part 94 and opening(s) in the first part 92, and retaining element(s) (e.g., nut(s)) may be engaged with the fastener(s) to secure the first storage tank to the first frame assembly 32. With the first storage tank secured to the first frame assembly, the first frame assembly supports the first storage tank (e.g., and any liquid within the first storage tank) on the structure (e.g., rear axle) of the work vehicle. The right section of the storage tank assembly may be coupled to the structure (e.g., rear axle) in a similar manner. In certain embodiments, once both sections of the storage tank assembly are coupled to the structure, the cross-bar may be coupled to each frame assembly, thereby enhancing the rigidity of the storage tank assembly.

In the illustrated embodiment, the two parts of the first frame assembly are sufficient to secure the first storage tank to the structure of the work vehicle. Utilizing the two-part frame assembly to couple the storage tank to the work vehicle structure may significantly reduce the complexity and duration associated with mounting the storage tank (e.g., as compared to coupling a storage tank to a work vehicle structure by coupling mounting part(s) to the work vehicle structure, engaging the storage tank with the mounting part(s), and then welding multiple additional parts to one another and to the mounting part(s) around the storage tank). In addition, the two-part frame assembly may facilitate rapid reconfiguration of the work vehicle. For example, one storage tank may be removed and replaced with another storage tank (e.g., a larger storage tank) by uncoupling the second part from the first part, removing and replacing the storage tank, and recoupling the second part to the first part (e.g., and mounting the cross-bar, if desired).

While the first part is coupled to the second part with fasteners in the illustrated embodiment, in other embodiments, the first part and the second part may be coupled to one another by any other suitable connection system (e.g., pins, clips, latches, etc.). Furthermore, while the first frame assembly only includes the first part and the second part in the illustrated embodiment, in other embodiments, the first frame assembly may include more or fewer parts (e.g., 1, 2, 3, 4, 5, 6, or more). In addition, while the first frame assembly is formed by coupling one part to another part around the first storage tank in the illustrated embodiment, in other embodiments, the first frame assembly may be formed by other suitable processes, and/or the first storage tank may be secured to the first frame assembly by other suitable processes. Furthermore, while the left section 22 of the storage tank assembly 12 is described above with reference to FIGS. 3-6, the right section of the storage tank assembly may have corresponding features and/or structures (e.g., the right section of the storage tank assembly may substantially mirror the left section).

Figure 7:
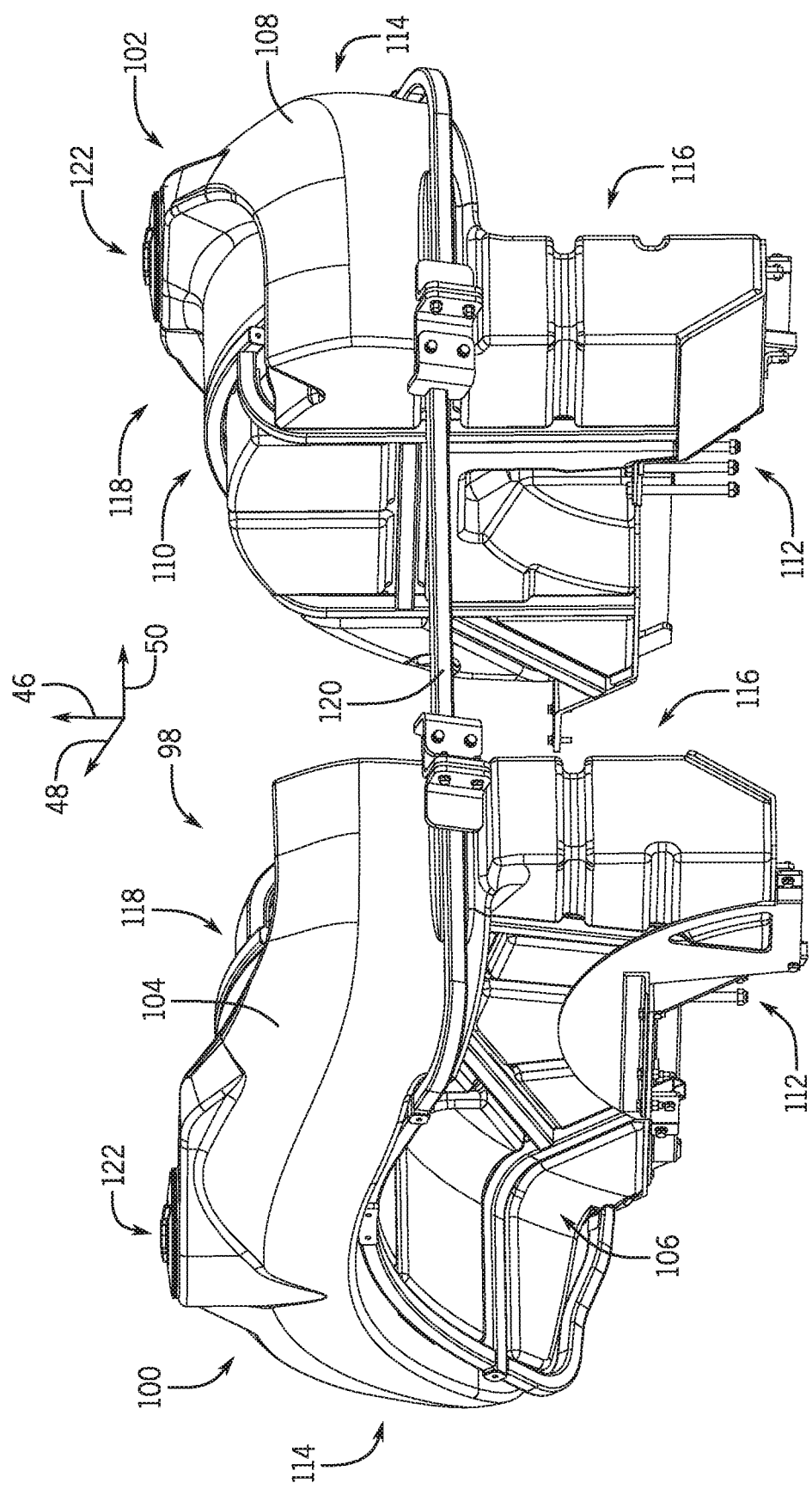
FIG. 7 is a perspective view of another embodiment of a storage tank assembly that may be employed within the work vehicle of FIG. 1.

FIG. 7 is a perspective view of another embodiment of a storage tank assembly 98 that may be employed within the work vehicle of FIG. 1. As illustrated, the storage tank assembly 98 includes a left section 100 and a right section 102. The left section 100 is configured to be positioned above and laterally inward of a left wheel assembly, and the right section 102 is configured to be positioned above and laterally inward of a right wheel assembly. The left section 100 of the storage tank assembly 98 includes a first storage tank 104 and a first frame assembly 106, and the right section 102 of the storage tank assembly 98 includes a second storage tank 108 and a second frame assembly 110. Each storage tank is configured to store a liquid, and each frame assembly is configured to couple to a structure of the work vehicle, such as the rear axle. In addition, each frame assembly is configured to support the respective storage tank on the structure of the work vehicle. In the illustrated embodiment, each section of the storage tank assembly 98 includes a respective mounting assembly 112 configured to couple the frame assembly of the section to the rear axle such that an entire weight of the storage tank assembly 98 (e.g., and any liquid within the storage tanks) is supported only by the rear axle. However, in other embodiments, the frame assemblies may be coupled to additional structure(s) of the work vehicle such that the weight of the storage tank assembly (e.g., and any liquid within the storage tanks) is supported by the rear axle and the additional structure(s). Furthermore, in certain embodiments, the frame assembly of at least one section may be coupled to another suitable structure of the work vehicle (e.g., a frame of the work vehicle) instead of the rear axle. In addition, while each frame assembly is coupled to the structure by a respective mounting assembly in the illustrated embodiment, in other embodiments, at least one frame assembly may be coupled to the structure of the work vehicle by another suitable connection system, such as a welded connection or an adhesively bonded connection.

In the illustrated embodiment, each storage tank includes a first portion 114 and a second portion 116. The first frame assembly 106 is configured to position the first portion 114 of the first storage tank 104 above the left wheel assembly along the vertical axis 46, and the second frame assembly 110 is configured to position the first portion 114 of the second storage tank 108 above the right wheel assembly along the vertical axis 46. In addition, the first portion of each storage tank (e.g., a bottom surface of the first portion) is contoured to substantially match the curvature of the respective wheel assembly (e.g., the curvature of a tire of the respective wheel assembly). As illustrated, a bottom surface of the first portion of each storage tank curves along the longitudinal axis 48, such that a radius of curvature of the bottom surface substantially matches a radius of curvature of the respective wheel assembly (e.g., the difference between the radius of curvature of the bottom surface and the radius of curvature of the wheel assembly is less than 15 percent, less than 10 percent, less than 5 percent, or less than 2 percent). Because the contour of the bottom surface of the first portion of each storage tank substantially matches the curvature of the respective wheel assembly, the storage tank may block significantly more debris (e.g., dirt, rocks, etc.) from being expelled by the wheel assembly during operation of the work vehicle than a storage tank with a substantially flat bottom surface positioned over the respective wheel assembly. In addition, the center of gravity of the work vehicle may be lowered (e.g., as compared to a work vehicle having a storage tank with a substantially flat bottom surface positioned over a respective wheel assembly), thereby increasing the stability of the work vehicle. Furthermore, in the illustrated embodiment, the curvature of the top surface of the first portion of each storage tank substantially matches the curvature of the respective bottom surface, thereby further lowering the center of gravity. However, in other embodiments, the first portion of at least one storage tank may have another suitable shape.

Furthermore, the first frame assembly 106 is configured to position the second portion 116 of the first storage tank 104 inward of the left wheel assembly along the lateral axis 50, such that the second portion 116 of the first storage tank 104 extends within a vertical extent of the left wheel assembly (e.g., the extent of the left wheel assembly along the vertical axis 46). In addition, the second frame assembly 110 is configured to position the second portion 116 of the second storage tank 108 inward of the right wheel assembly along the lateral axis 50, such that the second portion 116 of the second storage tank 108 extends within a vertical extent of the right wheel assembly (e.g., the extent of the right wheel assembly along the vertical axis 46). By positioning the second portion of each storage tank laterally inward of the respective wheel assembly, a volume of the storage tank is positioned remote from the field of view of the work vehicle operator, thereby enhancing operator visibility. In addition, because the second portion of each storage tank overlaps the respective wheel assembly along the vertical axis, the center of gravity of the work vehicle may be lowered (e.g., as compared to a work vehicle having a storage tank mounted laterally outward from the cab and having a vertical extent that overlaps a vertical extent of the cab), thereby increasing the stability of the work vehicle.

In the illustrated embodiment, the first portion 114 of each storage tank extends across an entire lateral extent of the respective wheel assembly (e.g., the extent of the wheel assembly along the lateral axis 50). However, in alternative embodiments, the first portion of at least one storage tank may extend across a portion of the lateral extent of the respective wheel assembly. Furthermore, the second portion 116 of each storage tank has a generally rectangular cross-section within a plane formed by the vertical axis 46 and the lateral axis 50. However, in other embodiments, the second portion of at least one storage tank may have any other suitable shape (e.g., to accommodate elements/structures of the work vehicle). In addition, while each storage tank in the illustrated embodiment includes a first portion and a second portion, in alternative embodiments, one portion of at least one storage tank may be omitted. For example, in certain embodiments, the second portion (e.g., the portion positioned laterally inward of the respective wheel assembly and overlapping the respective wheel assembly along the vertical axis) of at least one storage tank may be omitted. Furthermore, in certain embodiments, the first portion (e.g., the portion positioned above the respective wheel assembly along the vertical axis) of at least one storage tank may be omitted.

In the illustrated embodiment, each storage tank includes a respective recess 118 configured to receive a fender of the work vehicle. The recess 118 enables the storage tank to be positioned between the respective wheel assembly and the fender (e.g., while the work vehicle includes wheel assemblies that establish gaps between the wheel assemblies and the fenders sufficient to accommodate the storage tanks). However, in alternative embodiments, the recess of at least one storage tank may be omitted, and the storage tank (e.g., the first portion of the storage tank) may serve as the fender. In such embodiments, light(s), reflector(s), antenna(s), other suitable components, or a combination thereof, may be mounted to the storage tank (e.g., to the first portion of the storage tank).

As discussed in detail below, each frame assembly is formed from multiple bars coupled to one another to establish a framework that supports the respective storage tank. In the illustrated embodiment, the storage tank assembly 98 includes a cross-bar 120 coupled to the bars of the first frame assembly 106 and to the bars of the second frame assembly 110. The cross-bar 120 is secured to a mounting plate of each frame assembly via fasteners. However, in alternative embodiments, the cross-bar may be coupled to each frame assembly by any suitable connection system (e.g., a welded connection, an adhesive connection, etc.). The cross-bar 120 is configured to increase the stability of the storage tanks during operation of the work vehicle. However, in certain embodiments, mounting assemblies, which couple the frame assemblies to the work vehicle structure, may effectively support the storage tanks (e.g., and any liquid within the storage tanks) without the cross-bar. In such embodiments, the cross-bar may be omitted.

In the illustrated embodiment, each portion of the storage tank assembly 98 includes a filler assembly 122 configured to facilitate flowing liquid into the respective storage tank. Each filler assembly 122 may include a filler cap configured to selectively facilitate access to an interior of the respective storage tank. For example, the filler cap may be coupled and uncoupled from a housing of the filler assembly via rotation of the filler cap (e.g., via engagement and disengagement of respective threads). Furthermore, in certain embodiments, each filler assembly 122 may include an integrated breather, thereby enabling air to escape the respective storage tank during the liquid filling process and/or enabling air/vapor to escape from the storage tank during operation of the work vehicle. However, in other embodiments, the breather may be separate from the filler assembly or omitted.

In certain embodiments, each storage tank may include one or more features configured to facilitate flowing liquid out of the storage tank and/or determining a level of the liquid within the storage tank. For example, the storage tank assembly may include one or more pumps configured to flow liquid out of the storage tanks. However, in further embodiments, at least one storage tank may include an outlet at the bottom of the storage tank to enable liquid to flow out of the storage tank under the influence of gravity. Furthermore, in certain embodiments, at least one storage tank may include a fill level indicator. For example, the storage tank may include a transparent/translucent window that enables an operator to visually determine the level of liquid within the storage tank. In addition or alternatively, an electronic unit (e.g., float/sender) may be included and configured to output a signal indicative of the level of liquid within a respective storage tank. In certain embodiments, the storage tanks of the storage tank assembly may store the same liquid (e.g., water, etc.). However, in other embodiments, each storage tank of the storage tank assembly may store a different liquid. In such embodiments, the storage tank assembly may include a pump system (e.g., pump, hoses, fittings, etc.) for each storage tank to control the flow of each respective liquid. While storing water in the storage tanks is described above, each storage tank may be used to store any other suitable liquid, such as chlorinated water, liquid fertilizer, or oil, for example.

In the illustrated embodiment, each storage tank extends outwardly along the lateral axis 50 beyond the lateral extent of the respective frame assembly (e.g., and any other structural elements coupled to the respective frame assembly, such as the cross-bar). Accordingly, each frame assembly (e.g., and any other structural elements coupled to the respective frame assembly, such as the cross-bar) does not extend outwardly beyond the lateral extent of the respective storage tank along the lateral axis 50. As a result, for a selected liquid capacity, the extent of the storage tank assembly along the lateral axis 50 may be less than a storage tank assembly having a frame assembly/structural element that extends laterally beyond the outward lateral extent of a respective storage tank. In addition, for a storage tank assembly having a selected extent along the lateral axis, the capacity of the storage tanks may be greater than storage tanks of a storage tank assembly having a frame assembly/structural element that extends laterally beyond the outward lateral extent of a respective storage tank. However, in other embodiments, at least one frame assembly/structure element may extend laterally outward beyond the lateral extent of the respective storage tank(s).

Figure 8:
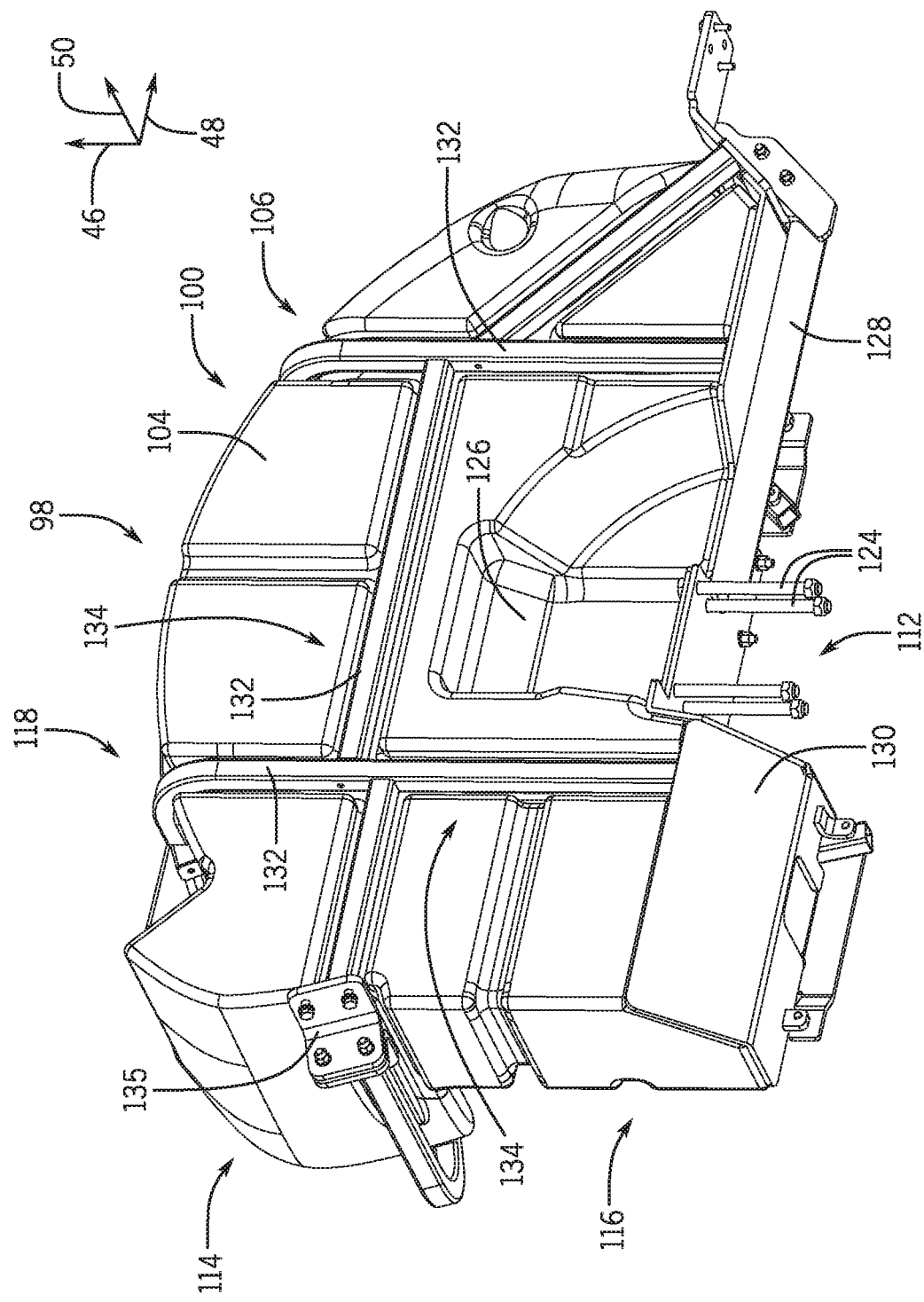
FIG. 8 is a perspective view of a left section of the storage tank assembly of FIG. 7.

FIG. 8 is a perspective view of a left section 100 of the storage tank assembly 98 of FIG. 7. As previously discussed, the left section 100 of the storage tank assembly 98 includes a mounting assembly 112 configured to couple the first frame assembly 106 to the rear axle. In the illustrated embodiment, the mounting assembly 112 includes four rods 124. In certain embodiments, a mounting plate may be positioned beneath the rear axle along the vertical axis 46, while the first frame assembly 106 is positioned above the rear axle along the vertical axis 46. The rods 124 may couple the mounting plate to the first frame assembly 106, thereby securing the first frame assembly 106 to the rear axle. In the illustrated embodiment, each rod includes a head at one end and a thread section at the other end. The head is configured to engage the first frame assembly 106 (e.g., a shield 128, a plate positioned above the shield, etc.), and a fastener (e.g., nut) is configured to engage the threaded section. As the fastener is driven to rotate about the threaded section of the rod, the rear axle is compressed between the first frame assembly and the mounting plate, thereby securing the first frame assembly to the rear axle. In the illustrated embodiment, a recess 126 is formed in the first storage tank 104 to facilitate access to the rod heads.

While the head of each rod is configured to engage the first frame assembly in certain embodiments, in other embodiments, the head of at least one rod may be configured to contact the mounting plate. In such embodiments, the threaded section of the at least one rod may extend through the first frame assembly (e.g., the shield of the first frame assembly), and a respective fastener may be engaged with the threaded section of the at least one rod and in contact with the first frame assembly. Furthermore, while the illustrated mounting assembly includes four rods, in other embodiments, the mounting assembly may include more or fewer rods (e.g., 1, 2, 3, 4, 5, 6, or more). In addition, at least one rod may engage the mounting plate and/or the first frame assembly via another suitable connection (e.g., instead of the head/fastener), such as a pin or a threaded connection, among other suitable connections. Furthermore, in certain embodiments, the rods and/or the mounting plate may be omitted, and the mounting assembly may couple the first frame assembly to the rear axle by another suitable type of connection system (e.g., a welded connection, an adhesive connection, a bolted connection, etc.).

In the illustrated embodiment, the first frame assembly 32 includes a shield 128 positioned beneath the second portion 116 of the first storage tank 104 along the vertical axis 46. In certain embodiments, the shield 128 is formed from at least one sheet of material (e.g., metal, composite material, etc.). However, in other embodiments, the shield may be formed from any suitable structure/material. The shield 128 is configured to block objects (e.g., rocks, agricultural material, etc.) from impacting the first storage tank 104, thereby increasing the longevity of the first storage tank 104. In addition, the shield 128 contacts a bottom surface of the second portion 116 of the first storage tank 104, thereby supporting at least a portion of the weight of the first storage tank 104 (e.g., and any liquid within the first storage tank).

In certain embodiments, the shield 128 may include one or more lips, such as the illustrated lip 130, configured to block movement of the first storage tank along the longitudinal axis and/or along the lateral axis. For example, each lip may be formed to substantially match the shape of the first storage tank at the location of the lip, thereby facilitating contact between the lip and the storage tank. The shield may include any suitable number of lips, such as 1, 2, 3, 4, 5, 6, 7, 8, 9, 10, or more. Furthermore, in certain embodiments, the lips may be omitted.

In the illustrated embodiment, the first frame assembly 106 includes multiple bars configured to support the first storage tank 104. As illustrated, the bars includes first bars 132 positioned generally on a laterally inward side of the first storage tank 104. Certain first bars 132 are coupled to the shield 128 (e.g., via a welded connection). The first bars 132 are configured to block laterally inward movement of the first storage tank 104 (e.g., movement of the first storage tank 104 inwardly along the lateral axis 50) relative to the first frame assembly 106. In addition, the first storage tank 104 includes first recesses 134 positioned on the laterally inward side of the first storage tank 104 and configured to receive the first bars 132, thereby enabling the lateral extent of the first storage tank 104 to be greater than a storage tank without the recess (e.g., a storage tank having a substantially flat surface that contacts the first bars). Furthermore, in the illustrated embodiment, the first frame assembly 106 includes a mounting plate 135 configured to support the cross-bar (e.g., via a fastener connection). However, if the cross-bar is omitted, the mounting plate may also be omitted.

Figure 9:
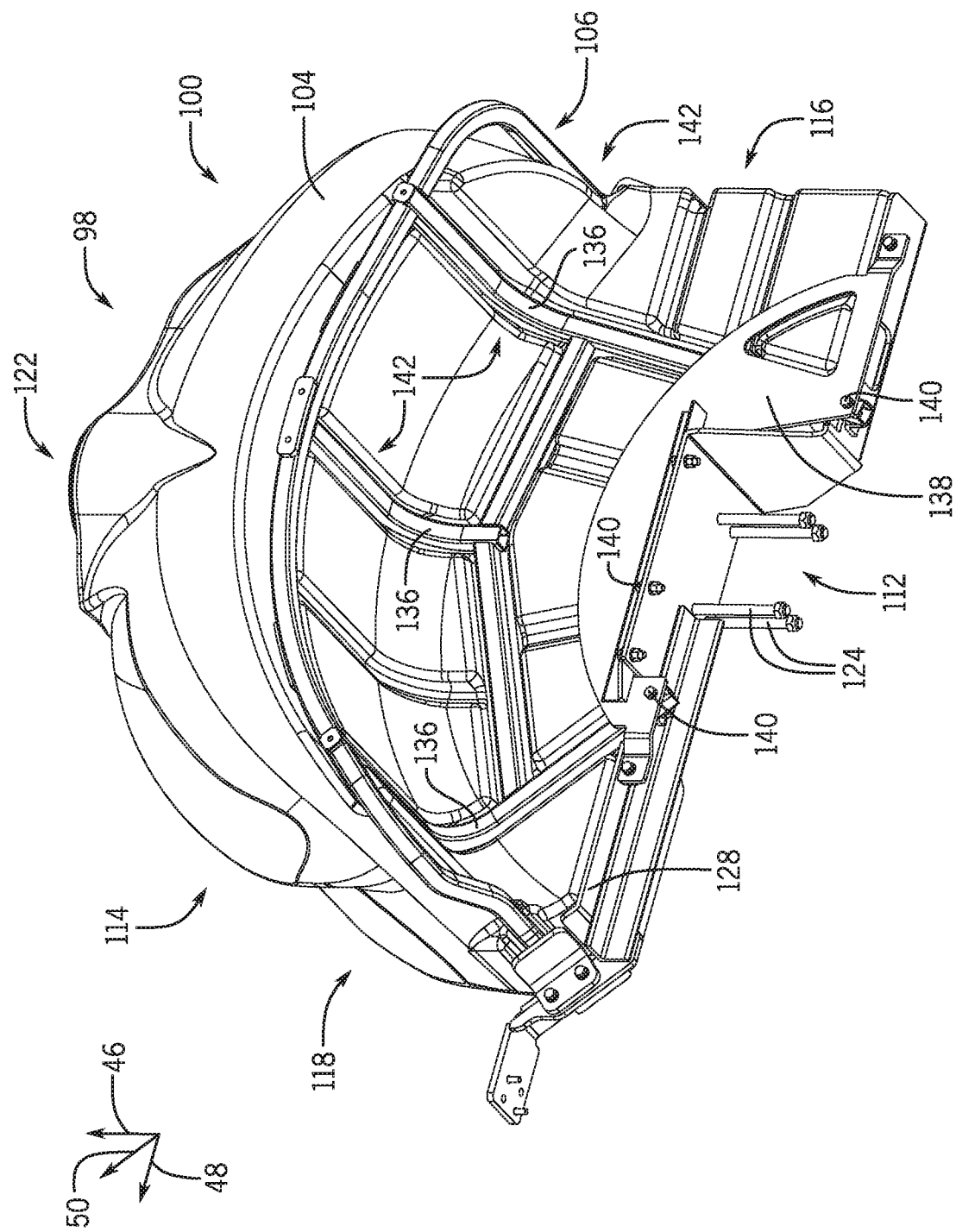
FIG. 9 is another perspective view of the left section of the storage tank assembly of FIG. 7.

FIG. 9 is another perspective view of the left section 100 of the storage tank assembly 98 of FIG. 7. In the illustrated embodiment, the first frame assembly 106 includes second bars 136 positioned generally on a laterally inward side of the first storage tank 104. As illustrated, two of the second bars 136 are coupled to a support plate 138 via fasteners 140. However, in other embodiments, more or fewer second bars may be coupled to the support plate, and/or the second bar(s) may be coupled to the support plate via any other suitable connection(s) (e.g., welded connection, adhesive connection, etc.). As discussed in detail below, the support plate 138 is coupled to the shield 128 via fasteners 140 (e.g., including the same fasteners that couple the second bars 136 to the support plate 138). The second bars 136 are configured to block laterally outward movement of the first storage tank 104 (e.g., outward movement of the first storage tank 104 along the lateral axis 50) relative to the first frame assembly 106 via contact with the second portion 116 of the first storage tank 104. In addition, the second bars 136 are configured to block downward movement of the first storage tank 104 (e.g., along the vertical axis 46) relative to the first frame assembly 106 via contact with the first portion 114 of the first storage tank 104. Accordingly, the second bars 136 are configured to support a portion of the weight of the first storage tank (e.g., and any liquid within the first storage tank). The first frame assembly 106 may include any suitable number of second bars 136, and the second bars 136 may be arranged in any suitable configuration.

In the illustrated embodiment, at least a portion of each second bar 136 is disposed within a respective recess 142, which is configured to receive the respective second bar. The recesses 142 enable the lateral extent of the second portion 116 of the first storage tank 104 and the vertical extent of the first portion 114 of the first storage tank 104 to be greater than a storage tank without the recesses (e.g., a storage tank having substantially flat surfaces that contact the bars). In the embodiment disclosed herein with reference to FIGS. 7-9, each bar is disposed within a respective recess. However, in alternative embodiments, at least one recess may be omitted (e.g., such that the respective bar contacts a substantially flat surface of the storage tank).

While the illustrated frame assembly is formed from the shield, the bars, and the support plate, in other embodiments, the frame assembly may be formed from any other and/or additional components suitable for supporting the respective storage tank. For example, the support plate may be omitted, and/or the shield may be omitted. In addition or alternatively, at least some of the bars may be omitted, and/or the frame assembly may include one or more plates configured to engage the storage tank.

Figure 10:
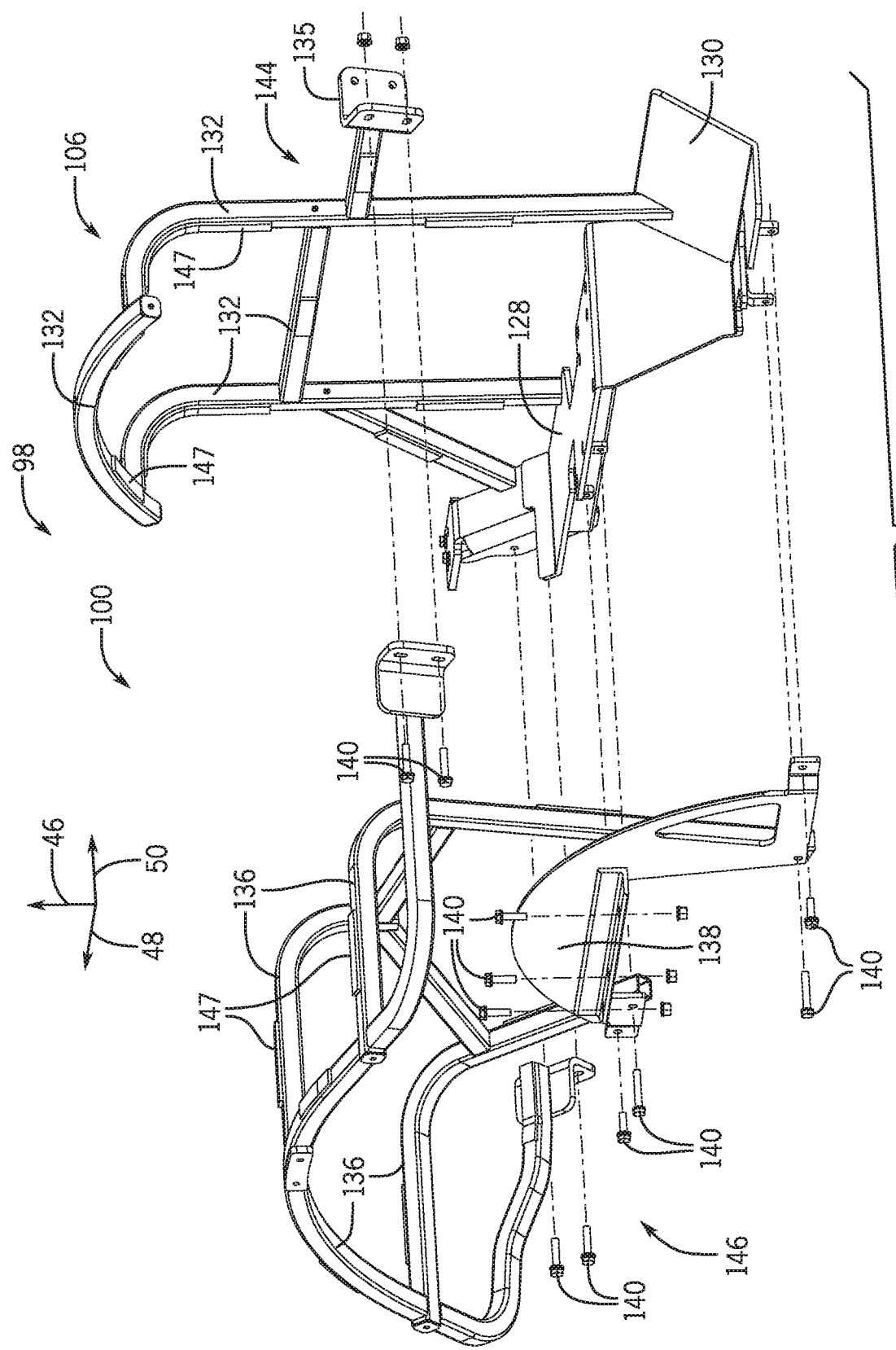
FIG. 10 is an exploded view of a frame assembly of the left section of the storage tank assembly of FIG. 7.

FIG. 10 is an exploded view of the first frame assembly 106 of the left section 100 of the storage tank assembly 98 of FIG. 7. As illustrated, the first frame assembly 106 include a first part 144 and a second part 146. The first part 144 is formed from the first bars 132 and the shield 128. For example, certain first bars 132 may be welded to the shield 128, and certain first bars 132 may be welded to one another. In addition, the second part 146 is formed from the support plate 138 and the second bars 136. For example, certain second bars 136 may be welded to one another, and certain second bars 136 may be coupled to the support plate 138 by fasteners 140 and/or by a welded connection.

In the illustrated embodiment, certain bars (e.g., certain first bars and/or certain second bars) of the first frame assembly 106 includes pads 147 configured to engage the first storage tank. The pads 147 may be formed from a resilient material and configured to absorb energy associated with movement of the first storage tank during operation of the work vehicle. Each bar may include any suitable number of pads (e.g., 0, 1, 2, 3, 4, 5, etc.). For example, in certain embodiments, at least one bar (e.g., all of the bars of the first frame assembly, a portion of the bars of the first frame assembly, etc.) may not include any pads.

To couple the left section 100 of the storage tank assembly 98 to a structure of the work vehicle (e.g., the rear axle), the first part 144 of the first frame assembly 106 may be coupled to the structure (e.g., via the mounting assembly). The first storage tank may then be translated toward the first part 144 of the first frame assembly 106 along the lateral axis 50. Upon contact between the first storage tank and the first bars 132 (e.g., as the first bars 132 engage the respective recesses within the first storage tank) movement of the first storage tank in the laterally inward direction is blocked. The second part 146 of the first frame assembly 106 may then be translated (e.g., along the lateral axis 50) toward the first storage tank until the second bars 136 of the second part 146 engage respective recesses in the first storage tank. Fasteners 140 may then be inserted through openings in the second part 146 and engaged with the first part 144 to secure the first storage tank to the first frame assembly 106. In certain embodiments, one or more fasteners 140 may be inserted through the opening(s) in the second part 146 and opening(s) in the first part 144, and retaining element(s) (e.g., nut(s)) may be engaged with the fastener(s) to secure the first storage tank to the first frame assembly 106. With the first storage tank secured to the first frame assembly, the first frame assembly supports the first storage tank (e.g., and any liquid within the first storage tank) on the structure (e.g., rear axle) of the work vehicle. The right section of the storage tank assembly may be coupled to the structure (e.g., rear axle) in a similar manner. In certain embodiments, once both sections of the storage tank assembly are coupled to the structure, the cross-bar may be coupled to each frame assembly, thereby enhancing the rigidity of the storage tank assembly.

In the illustrated embodiment, the two parts of the first frame assembly are sufficient to secure the storage tank to the structure of the work vehicle. Utilizing the two-part frame assembly to couple the storage tank to the work vehicle structure may significantly reduce the complexity and duration associated with mounting the storage tank (e.g., as compared to coupling a storage tank to a work vehicle structure by coupling mounting part(s) to the work vehicle structure, engaging the storage tank with the mounting part(s), and then welding multiple additional parts to one another and to the mounting part(s) around the storage tank). In addition, the two-part frame assembly may facilitate rapid reconfiguration of the work vehicle. For example, one storage tank may be removed and replaced with another storage tank (e.g., a larger storage tank) by uncoupling the second part from the first part, removing and replacing the storage tank, and recoupling the second part to the first part (e.g., and mounting the cross-bar, if desired).

While the first part is coupled to the second part with fasteners in the illustrated embodiment, in other embodiments, the first part and the second part may be coupled to one another by any other suitable connection system (e.g., pins, clips, latches, etc.). Furthermore, while the first frame assembly only includes the first part and the second part in the illustrated embodiment, in other embodiments, the first frame assembly may include more or fewer parts (e.g., 1, 2, 3, 4, 5, 6, or more). In addition, while the first frame assembly is formed by coupling one part to another part around the first storage tank in the illustrated embodiment, in other embodiments, the first frame assembly may be formed by other suitable processes, and/or the first storage tank may be secured to the first frame assembly by other suitable processes. While the frame assembly is formed separately from the storage tank in the illustrated embodiment, in other embodiments, at least a portion of the frame assembly (e.g., one or more bars) may be integrally formed with the storage tank (e.g., via a molding process). Furthermore, while the left section 100 of the storage tank assembly 98 is described above with reference to FIGS. 8-10, the right section of the storage tank assembly may have corresponding features and/or structures (e.g., the right section of the storage tank assembly may substantially mirror the left section).

Figure 11:
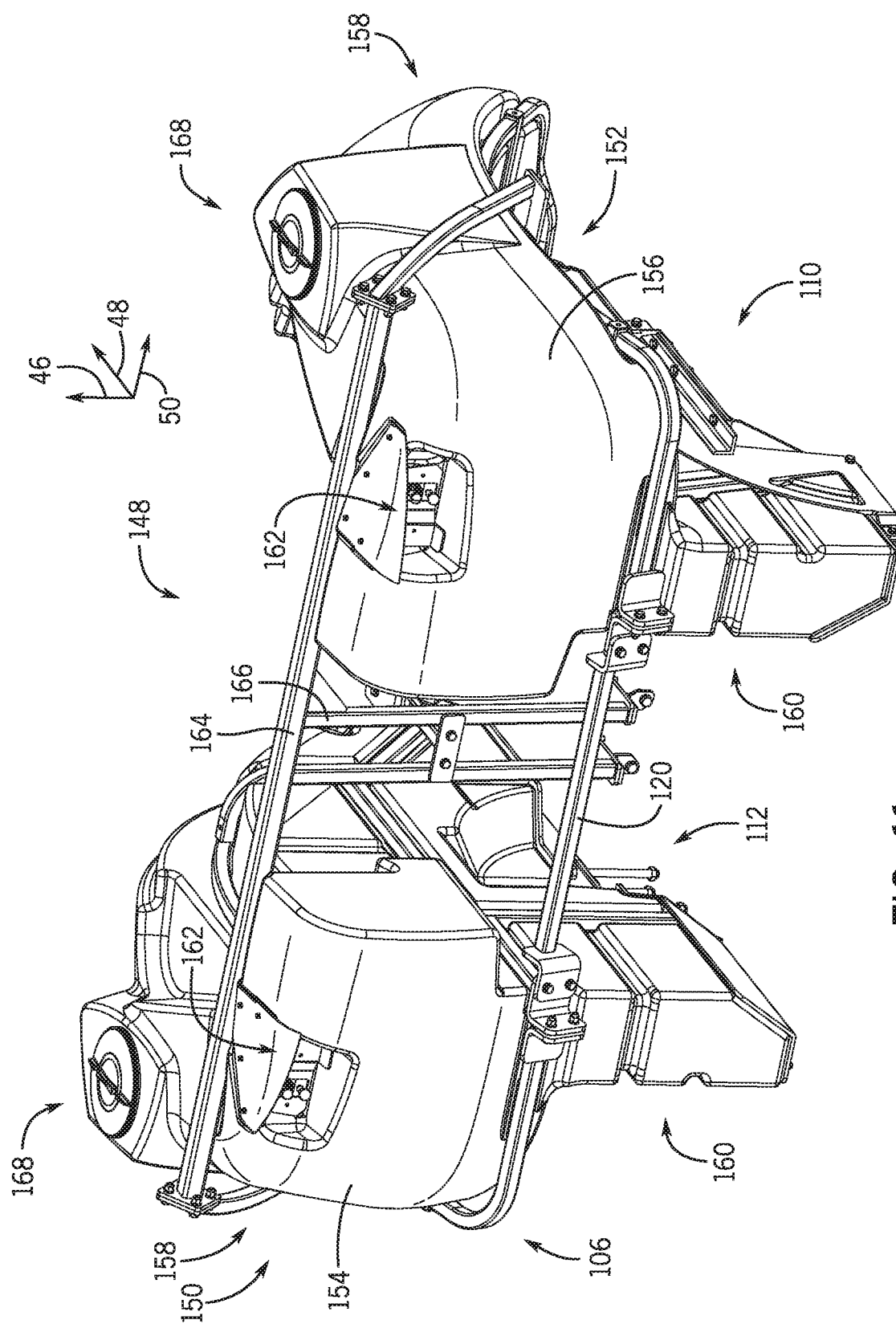
FIG. 11 is a perspective view of a further embodiment of a storage tank assembly that may be employed within the work vehicle of FIG. 1.

FIG. 11 is a perspective view of a further embodiment of a storage tank assembly 148 that may be employed within the work vehicle of FIG. 1. As illustrated, the storage tank assembly 148 includes a left section 150 and a right section 152. The left section 150 is configured to be positioned above and laterally inward of a left wheel assembly, and the right section 152 is configured to be positioned above and laterally inward of a right wheel assembly. The left section 150 of the storage tank assembly 148 includes a first storage tank 154 and the first frame assembly 106, and the right section 152 of the storage tank assembly 148 includes a second storage tank 156 and the second frame assembly 110. Each storage tank is configured to store a liquid, and each frame assembly is configured to couple to a structure of the work vehicle, such as the rear axle. In addition, each frame assembly is configured to support the respective storage tank on the structure of the work vehicle. In the illustrated embodiment, each section of the storage tank assembly 148 includes a respective mounting assembly 112 configured to couple the frame assembly of the section to the rear axle such that an entire weight of the storage tank assembly 148 (e.g., and any liquid within the storage tanks) is supported only by the rear axle. However, in other embodiments, the frame assemblies may be coupled to additional structure(s) of the work vehicle such that the weight of the storage tank assembly (e.g., and any liquid within the storage tanks) is supported by the rear axle and the additional structure(s). Furthermore, in certain embodiments, the frame assembly of at least one section may be coupled to another suitable structure of the work vehicle (e.g., a frame of the work vehicle) instead of the rear axle. In addition, while each frame assembly is coupled to the structure by a respective mounting assembly in the illustrated embodiment, in other embodiments, at least one frame assembly may be coupled to the structure of the work vehicle by another suitable connection system, such as a welded connection or an adhesively bonded connection.

In the illustrated embodiment, each storage tank includes a first portion 158 and a second portion 160. The first frame assembly 106 is configured to position the first portion 158 of the first storage tank 154 above the left wheel assembly along the vertical axis 46, and the second frame assembly 110 is configured to position the first portion 158 of the second storage tank 156 above the right wheel assembly along the vertical axis 46. In addition, the first portion of each storage tank (e.g., a bottom surface of the first portion) is contoured to substantially match the curvature of the respective wheel assembly (e.g., the curvature of a tire of the respective wheel assembly). As illustrated, a bottom surface of the first portion of each storage tank curves along the longitudinal axis 48, such that a radius of curvature of the bottom surface substantially matches a radius of curvature of the respective wheel assembly (e.g., the difference between the radius of curvature of the bottom surface and the radius of curvature of the wheel assembly is less than 15 percent, less than 10 percent, less than 5 percent, or less than 2 percent). Because the contour of the bottom surface of the first portion of each storage tank substantially matches the curvature of the respective wheel assembly, the storage tank may block significantly more debris (e.g., dirt, rocks, etc.) from being expelled by the wheel assembly during operation of the work vehicle than a storage tank with a substantially flat bottom surface positioned over the respective wheel assembly. In addition, the center of gravity of the work vehicle may be lowered (e.g., as compared to a work vehicle having a storage tank with a substantially flat bottom surface positioned over a respective wheel assembly), thereby increasing the stability of the work vehicle. Furthermore, in the illustrated embodiment, the curvature of the top surface of the first portion of each storage tank substantially matches the curvature of the respective bottom surface, thereby further lowering the center of gravity. However, in other embodiments, the first portion of at least one storage tank may have another suitable shape.

Furthermore, the first frame assembly 106 is configured to position the second portion 160 of the first storage tank 154 inward of the left wheel assembly along the lateral axis 50, such that the second portion 160 of the first storage tank 154 extends within a vertical extent of the left wheel assembly (e.g., the extent of the left wheel assembly along the vertical axis 46). In addition, the second frame assembly 110 is configured to position the second portion 160 of the second storage tank 156 inward of the right wheel assembly along the lateral axis 50, such that the second portion 160 of the second storage tank 156 extends within a vertical extent of the right wheel assembly (e.g., the extent of the right wheel assembly along the vertical axis 46). By positioning the second portion of each storage tank laterally inward of the respective wheel assembly, a volume of the storage tank is positioned remote from the field of view of the work vehicle operator, thereby enhancing operator visibility. In addition, because the second portion of each storage tank overlaps the respective wheel assembly along the vertical axis, the center of gravity of the work vehicle may be lowered (e.g., as compared to a work vehicle having a storage tank mounted laterally outward from the cab and having a vertical extent that overlaps a vertical extent of the cab), thereby increasing the stability of the work vehicle.

In the illustrated embodiment, the first portion 158 of each storage tank extends across an entire lateral extent of the respective wheel assembly (e.g., the extent of the wheel assembly along the lateral axis 50). However, in alternative embodiments, the first portion of at least one storage tank may extend across a portion of the lateral extent of the respective wheel assembly. Furthermore, the second portion 160 of each storage tank has a generally rectangular cross-section within a plane formed by the vertical axis 46 and the lateral axis 50. However, in other embodiments, the second portion of at least one storage tank may have any other suitable shape (e.g., to accommodate elements/structures of the work vehicle). In addition, while each storage tank in the illustrated embodiment includes a first portion and a second portion, in alternative embodiments, one portion of at least one storage tank may be omitted. For example, in certain embodiments, the second portion (e.g., the portion positioned laterally inward of the respective wheel assembly and overlapping the respective wheel assembly along the vertical axis) of at least one storage tank may be omitted. Furthermore, in certain embodiments, the first portion (e.g., the portion positioned above the respective wheel assembly along the vertical axis) of at least one storage tank may be omitted.

In the illustrated embodiment, the first portion 158 of each storage tank serves as a respective fender. Accordingly, the recess described above with reference to FIGS. 2 and 7 is omitted. In the illustrated embodiment, a brake light assembly 162 is integrated within the first portion 158 of each storage tank. Accordingly, a separate brake light assembly (e.g., coupled to a fender) is obviated. Furthermore, in certain embodiments, additional light(s), reflector(s), antenna(s), other suitable components, or a combination thereof, may be mounted to/integrated within the storage tank. Because the first portion 158 of each storage tank serves as the respective fender in the illustrated embodiment, the cost of the work vehicle may be reduced, as compared to a work vehicle having a separate storage tank/fender configuration.

As previously discussed, each frame assembly is formed from multiple bars coupled to one another to establish a framework that supports the respective storage tank. In the illustrated embodiment, the storage tank assembly 148 includes the cross-bar 120 coupled to the bars of the first frame assembly 106 and to the bars of the second frame assembly 110. The cross-bar 120 is secured to a mounting plate of each frame assembly via fasteners. The cross-bar 120 is configured to increase the stability of the storage tanks during operation of the work vehicle. Furthermore, in the illustrated embodiment, the storage tank assembly 148 includes a second cross-bar assembly 164 coupled to the bars of the first frame assembly 106 and to the bars of the second frame assembly 110. The second cross-bar assembly 164 is configured to further increase the stability of the storage tanks during operation of the work vehicle. While the storage tank assembly 148 includes the cross-bar 120 and the second cross-bar assembly 164 in the illustrated embodiment, in other embodiments, at least one of these elements may be omitted and/or additional cross-member(s) may be disposed between the frame assemblies to increase the stability of the storage tanks. Furthermore, in the illustrated embodiment, the storage tank assembly 148 includes an additional support 166 coupled to the second cross-bar assembly 164 and configured to couple to the rear axle, thereby further increasing the stability of the storage tanks during operation of the work vehicle. However, in other embodiments, the additional support may be omitted, and/or the storage tank assembly may include other and/or additional supports configured to couple the storage tank assembly to the structure of the work vehicle.

In the illustrated embodiment, each portion of the storage tank assembly 148 includes a filler assembly 168 configured to facilitate flowing liquid into the respective storage tank. Each filler assembly 168 may include a filler cap configured to selectively facilitate access to an interior of the respective storage tank. For example, the filler cap may be coupled and uncoupled from a housing of the filler assembly via rotation of the filler cap (e.g., via engagement and disengagement of respective threads). Furthermore, in certain embodiments, each filler assembly 168 may include an integrated breather, thereby enabling air to escape the respective storage tank during the liquid filling process and/or enabling air/vapor to escape from the storage tank during operation of the work vehicle. However, in other embodiments, the breather may be separate from the filler assembly or omitted.

In certain embodiments, each storage tank may include one or more features configured to facilitate flowing liquid out of the storage tank and/or determining a level of the liquid within the storage tank. For example, the storage tank assembly may include one or more pumps configured to flow liquid out of the storage tanks. However, in further embodiments, at least one storage tank may include an outlet at the bottom of the storage tank to enable liquid to flow out of the storage tank under the influence of gravity. Furthermore, in certain embodiments, at least one storage tank may include a fill level indicator. For example, the storage tank may include a transparent/translucent window that enables an operator to visually determine the level of liquid within the storage tank. In addition or alternatively, an electronic unit (e.g., float/sender) may be included and configured to output a signal indicative of the level of liquid within a respective storage tank. In certain embodiments, the storage tanks of the storage tank assembly may store the same liquid (e.g., water, etc.). However, in other embodiments, each storage tank of the storage tank assembly may store a different liquid. In such embodiments, the storage tank assembly may include a pump system (e.g., pump, hoses, fittings, etc.) for each storage tank to control the flow of each respective liquid. While storing water in the storage tanks is described above, each storage tank may be used to store any other suitable liquid, such as chlorinated water, liquid fertilizer, or oil, for example.

In the illustrated embodiment, the first frame assembly 106, the second frame assembly 110, and the cross-bar 120 are the same as the first frame assembly, the second frame assembly, and the cross-bar of the embodiment described above with reference to FIGS. 7-10. However, the capacity of each storage tank (e.g., 150 gallons, 568 liters) in the illustrated embodiment is greater than the capacity of each storage tank (e.g., 120 gallons, 454 liters) in the embodiment described above with reference to FIGS. 7-10. Accordingly, the illustrated first frame assembly 106 and the second frame assembly 110 may be configured to support storage tanks of multiple capacities.

Figure 12:
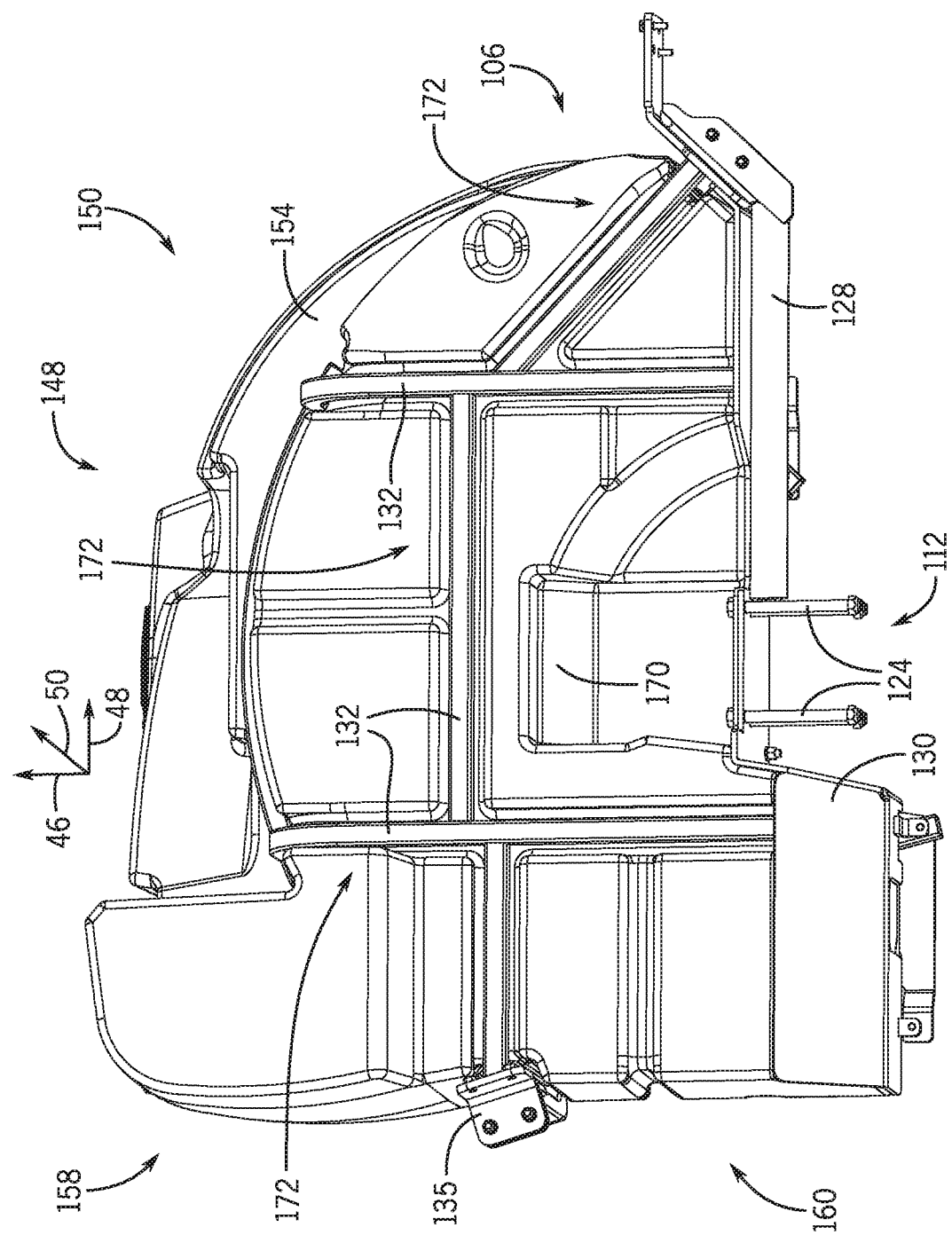
FIG. 12 is a perspective view of a left section of the storage tank assembly of FIG. 11.

FIG. 12 is a perspective view of the left section 150 of the storage tank assembly 148 of FIG. 11. As previously discussed, the left section 150 of the storage tank assembly 148 includes a mounting assembly 112 configured to couple the first frame assembly 106 to the rear axle. In the illustrated embodiment, the mounting assembly 112 includes four rods 124. In certain embodiments, a mounting plate may be positioned beneath the rear axle along the vertical axis 46, while the first frame assembly 106 is positioned above the rear axle along the vertical axis 46. The rods 124 may couple the mounting plate to the first frame assembly 106, thereby securing the first frame assembly 106 to the rear axle. In the illustrated embodiment, each rod includes a head at one end and a thread section at the other end. The head is configured to engage the first frame assembly 106 (e.g., the shield 128, a plate positioned above the shield, etc.), and a fastener (e.g., nut) is configured to engage the threaded section. As the fastener is driven to rotate about the threaded section of the rod, the rear axle is compressed between the first frame assembly and the mounting plate, thereby securing the first frame assembly to the rear axle. In the illustrated embodiment, a recess 170 is formed in the first storage tank 104 to facilitate access to the rod heads.

While the head of each rod is configured to engage the first frame assembly in certain embodiments, in other embodiments, the head of at least one rod may be configured to contact the mounting plate. In such embodiments, the threaded section of the at least one rod may extend through the first frame assembly (e.g., the shield of the first frame assembly), and a respective fastener may be engaged with the threaded section of the at least one rod and in contact with the first frame assembly. Furthermore, while the illustrated mounting assembly includes four rods, in other embodiments, the mounting assembly may include more or fewer rods (e.g., 1, 2, 3, 4, 5, 6, or more). In addition, at least one rod may engage the mounting plate and/or the first frame assembly via another suitable connection (e.g., instead of the head/fastener), such as a pin or a threaded connection, among other suitable connections. Furthermore, in certain embodiments, the rods and/or the mounting plate may be omitted, and the mounting assembly may couple the first frame assembly to the rear axle by another suitable type of connection system (e.g., a welded connection, an adhesive connection, a bolted connection, etc.).

In the illustrated embodiment, the shield 128 of the first frame assembly 106 is positioned beneath the second portion 160 of the first storage tank 154 along the vertical axis 46. As previously discussed, the shield 128 is configured to block objects (e.g., rocks, agricultural material, etc.) from impacting the first storage tank 154, thereby increasing the longevity of the first storage tank 154. In addition, the shield 128 contacts a bottom surface of the second portion 160 of the first storage tank 154, thereby supporting at least a portion of the weight of the first storage tank 154 (e.g., and any liquid within the first storage tank).

As previously discussed, the first frame assembly 106 includes multiple bars configured to support the first storage tank 154. As illustrated, the first bars 132 are positioned generally on a laterally inward side of the first storage tank 154. Certain first bars 132 are coupled to the shield 128 (e.g., via a welded connection). The first bars 132 are configured to block laterally inward movement of the first storage tank 154 (e.g., movement of the first storage tank 154 inwardly along the lateral axis 50) relative to the first frame assembly 106. In addition, the first storage tank 154 includes first recesses 172 positioned on the laterally inward side of the first storage 154 and configured to receive the first bars 132, thereby enabling the lateral extent of the first storage tank 154 to be greater than a storage tank without the recess (e.g., a storage tank having a substantially flat surface that contacts the first bars). Furthermore, as previously discussed, the first frame assembly 106 includes a mounting plate 135 configured to support the cross-bar (e.g., via a fastener connection). However, if the cross-bar is omitted, the mounting plate may also be omitted.

Figure 13:
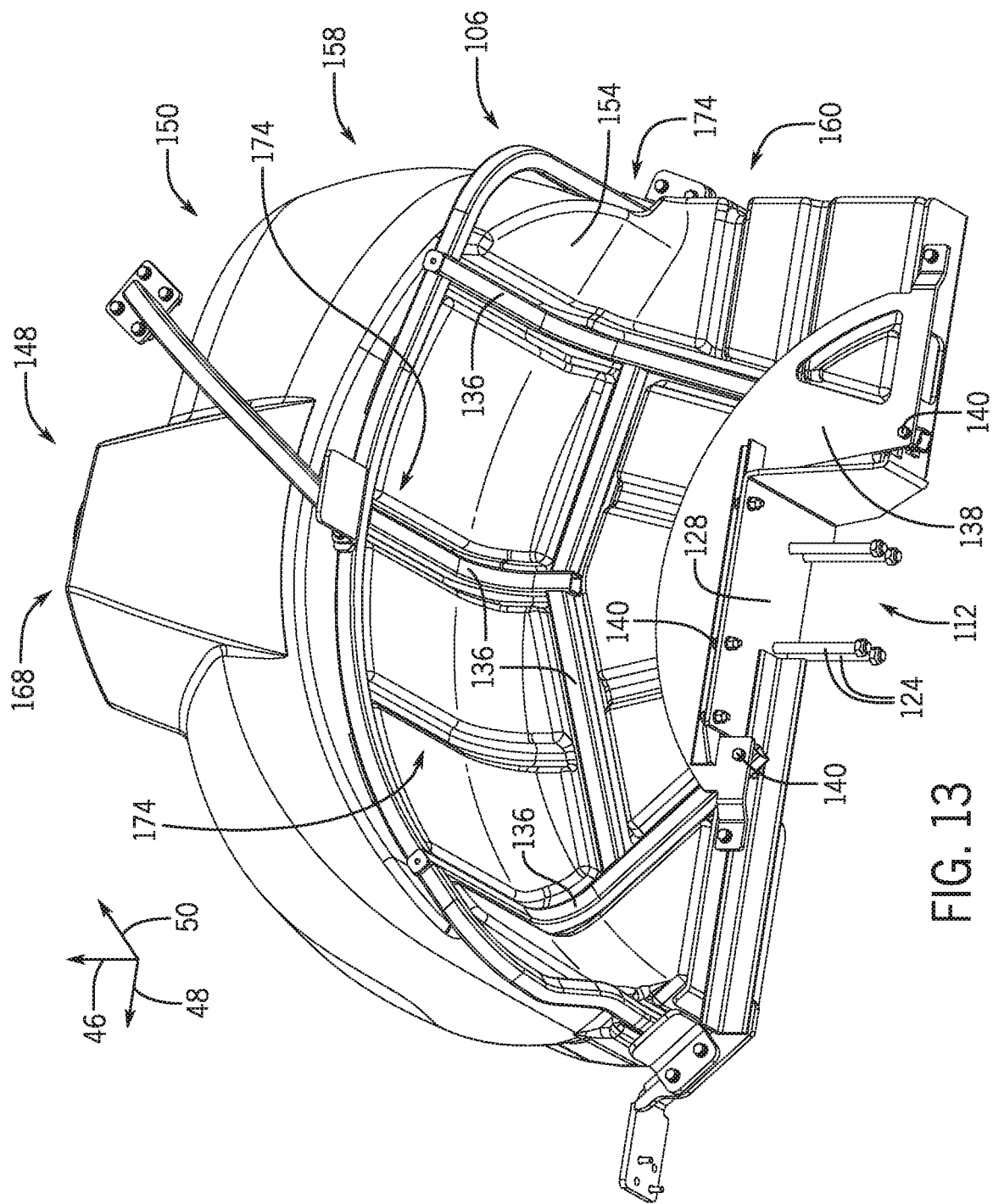
FIG. 13 is another perspective view of the left section of the storage tank assembly of FIG. 11.

FIG. 13 is another perspective view of the left section 150 of the storage tank assembly 148 of FIG. 11. In the illustrated embodiment, the second bars 136 of the first frame assembly 106 are positioned generally on a laterally inward side of the first storage tank 154. As illustrated, two of the second bars 136 are coupled to the support plate 138 via fasteners 140. However, in other embodiments, more or fewer second bars may be coupled to the support plate, and/or the second bar(s) may be coupled to the support plate via any other suitable connection(s) (e.g., welded connection, adhesive connection, etc.). As previously discussed, the support plate 138 is coupled to the shield 128 via fasteners 140 (e.g., including the same fasteners that couple the second bars 136 to the support plate 138). The second bars 136 are configured to block laterally outward movement of the first storage tank 154 (e.g., outward movement of the first storage tank 154 along the lateral axis 50) relative to the first frame assembly 106 via contact with the second portion 160 of the first storage tank 154. In addition, the second bars 136 are configured to block downward movement of the first storage tank 154 (e.g., along the vertical axis 46) relative to the first frame assembly 106 via contact with the first portion 158 of the first storage tank 154. Accordingly, the second bars 136 are configured to support a portion of the weight of the first storage tank (e.g., and any liquid within the first storage tank). As previously discussed, the first frame assembly 106 may include any suitable number of second bars 136, and the second bars 136 may be arranged in any suitable configuration.

In the illustrated embodiment, at least a portion of each second bar 136 is disposed within a respective recess 174, which is configured to receive the respective second bar. The recesses 174 enable the lateral extent of the second portion 160 of the first storage tank 154 and the vertical extent of the first portion 158 of the first storage tank 154 to be greater than a storage tank without the recesses (e.g., a storage tank having substantially flat surfaces that contact the bars). In the embodiment disclosed herein with reference to FIGS. 11-13, each bar is disposed within a respective recess. However, in alternative embodiments, at least one recess may be omitted (e.g., such that the respective bar contacts a substantially flat surface of the storage tank).

While the illustrated frame assembly is formed from the shield, the bars, and the support plate, in other embodiments, the frame assembly may be formed from any other and/or additional components suitable for supporting the respective storage tank. For example, the support plate may be omitted and/or the shield may be omitted. In addition or alternatively, at least some of the bars may be omitted and/or the frame assembly may include one or more plates configured to engage the storage tank. Furthermore, while the frame assembly is formed separately from the storage tank in the illustrated embodiment, in other embodiments, at least a portion of the frame assembly (e.g., one or more bars) may be integrally formed with the storage tank (e.g., via a molding process). In addition, while the left section 150 of the storage tank assembly 148 is described above with reference to FIGS. 12-13, the right section of the storage tank assembly may have corresponding features and/or structures (e.g., the right section of the storage tank assembly may substantially mirror the left section).

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A storage tank assembly for a work vehicle, comprising:
a frame assembly configured to couple to a structure of the work vehicle, wherein the frame assembly comprises a shield formed from at least one sheet of material; and
a storage tank configured to store a liquid, wherein the frame assembly is configured to support the storage tank on the structure of the work vehicle;
wherein the frame assembly is configured to position a first portion of the storage tank above a wheel assembly of the work vehicle, the first portion of the storage tank is contoured to substantially match a curvature of the wheel assembly, and the frame assembly is configured to position a second portion of the storage tank laterally inward of the wheel assembly such that the second portion of the storage tank extends within a vertical extent of the wheel assembly, and
wherein the shield is positioned beneath the second portion of the storage tank, and the shield comprises at least one lip configured to contact the storage tank to block movement of the storage tank relative to the frame assembly.

2. The storage tank assembly of claim 1, comprising a mounting assembly, wherein the structure comprises a rear axle, and the mounting assembly is configured to couple the frame assembly to the rear axle such that an entire weight of the storage tank assembly is supported only by the rear axle.

3. The storage tank assembly of claim 2, wherein the mounting assembly comprises a mounting plate and a plurality of rods, the mounting plate is configured to be positioned beneath the rear axle, the frame assembly is configured to be positioned above the rear axle, and the plurality of rods is configured to couple the mounting plate to the frame assembly.

4. The storage tank assembly of claim 1, wherein the first portion of the storage tank is configured to extend across an entire lateral extent of the wheel assembly.

5. A storage tank assembly for a work vehicle of claim 4, comprising:
a frame assembly configured to couple to a structure of the work vehicle, wherein the frame assembly comprises:
a shield formed from at least one sheet of material; and
a plurality of bars coupled to the shield; and
a storage tank configured to store a liquid, wherein the plurality of bars of the frame assembly are configured to support the storage tank;
wherein the frame assembly is configured to position a first portion of the storage tank above a wheel assembly of the work vehicle, the first portion of the storage tank is contoured to substantially match a curvature of the wheel assembly, and the frame assembly is configured to position a second portion of the storage tank laterally inward of the wheel assembly such that the second portion of the storage tank extends within a vertical extent of the wheel assembly, and
wherein the shield is positioned beneath the second portion of the storage tank.

6. The storage tank assembly of claim 5, wherein the storage tank comprises at least one recess configured to receive at least one bar of the plurality of bars.

7. A storage tank assembly for a work vehicle, comprising:
a first frame assembly configured to couple to a structure of the work vehicle, wherein the first frame assembly comprises:

a first shield formed from at least one first sheet of material; and
a first plurality of bars coupled to the first shield;
a first storage tank configured to store a first liquid, wherein the first plurality of bars of the first frame assembly are configured to support the first storage tank on the structure of the work vehicle;
a second frame assembly configured to couple to the structure of the work vehicle, the second frame assembly comprises:
a second shield formed from at least one second sheet of material; and
a second plurality of bars coupled to the second shield;
a second storage tank configured to store a second liquid, wherein the second plurality of bars of the second frame assembly are configured to support the second storage tank on the structure of the work vehicle;
wherein the first frame assembly is configured to position a first portion of the first storage tank above a left wheel assembly of the work vehicle, the first portion of the first storage tank is contoured to substantially match a curvature of the left wheel assembly, and the first frame assembly is configured to position a second portion of the first storage tank laterally inward of the left wheel assembly such that the second portion of the first storage tank extends within a vertical extent of the left wheel assembly;
wherein the first shield is positioned beneath the second portion of the first storage tank, and the second shield is positioned beneath the second portion of the second storage tank; and
wherein the second frame assembly is configured to position a first portion of the second storage tank above a right wheel assembly of the work vehicle, the first portion of the second storage tank is contoured to substantially match a curvature of the right wheel assembly, and the second frame assembly is configured to position a second portion of the second storage tank laterally inward of the right wheel assembly such that the second portion of the second storage tank extends within a vertical extent of the right wheel assembly.

8. The storage tank assembly of claim 7, comprising a cross-bar coupled to the first plurality of bars and to the second plurality of bars.

9. The storage tank assembly of claim 7, comprising a first mounting assembly and a second mounting assembly;
wherein the structure comprises a rear axle; and
wherein the first mounting assembly is configured to couple the first frame assembly to rear axle, and the second mounting assembly is configured to couple the second frame assembly to the rear axle, such that an entire weight of the storage tank assembly is supported only by the rear axle.

10. The storage tank assembly of claim 9, wherein at least one of the first mounting assembly and the second mounting assembly comprises a mounting plate and a plurality of rods, the mounting plate is configured to be positioned beneath the rear axle, a respective frame assembly of the first and second frame assemblies is configured to be positioned above the rear axle, and the plurality of rods is configured to couple the mounting plate to the respective frame assembly.

11. The storage tank assembly of claim 7, wherein the first portion of the first storage tank is configured to extend across an entire lateral extent of the left wheel assembly, the first portion of the second storage tank is configured to extend across an entire lateral extent of the right wheel assembly, or a combination thereof.

* * * * *